(12) United States Patent
Zhuge et al.

(10) Patent No.: US 12,079,575 B2
(45) Date of Patent: Sep. 3, 2024

(54) CHARACTER DISPLAY METHOD AND APPARATUS, ELECTRONIC DEVICE, AND COMPUTER-READABLE STORAGE MEDIUM

(71) Applicant: BEIJING BYTEDANCE NETWORK TECHNOLOGY CO., LTD., Beijing (CN)

(72) Inventors: Jingjing Zhuge, Beijing (CN); Guangyao Ni, Beijing (CN); Yanhao Shen, Beijing (CN); Hui Yang, Beijing (CN); Yepeng Chen, Beijing (CN)

(73) Assignee: BEIJING BYTEDANCE NETWORK TECHNOLOGY CO., LTD. (CN)

( * ) Notice: Subject to any disclaimer, the term of this patent is extended or adjusted under 35 U.S.C. 154(b) by 0 days.

(21) Appl. No.: 18/245,056

(22) PCT Filed: Aug. 10, 2021

(86) PCT No.: PCT/CN2021/111842
§ 371 (c)(1),
(2) Date: Mar. 13, 2023

(87) PCT Pub. No.: WO2022/083239
PCT Pub. Date: Apr. 28, 2022

(65) Prior Publication Data
US 2023/0367963 A1    Nov. 16, 2023

(30) Foreign Application Priority Data

Oct. 23, 2020 (CN) .......................... 202011144913.2

(51) Int. Cl.
*G06F 17/00* (2019.01)
*G06F 40/109* (2020.01)
*G06F 40/279* (2020.01)

(52) U.S. Cl.
CPC .......... *G06F 40/279* (2020.01); *G06F 40/109* (2020.01)

(58) Field of Classification Search
CPC .... G06F 40/279; G06F 40/109; G06T 11/001; G06T 11/60
See application file for complete search history.

(56) References Cited

U.S. PATENT DOCUMENTS

| 7,302,438 B1 | 11/2007 | Gauthier et al. |
| 8,760,451 B2 | 6/2014 | Cornell |

(Continued)

FOREIGN PATENT DOCUMENTS

| CN | 101483035 A | 7/2009 |
| CN | 103474081 A | 12/2013 |

(Continued)

OTHER PUBLICATIONS

CN111222301A, Kong et al, English translation, filed Jun. 2, 2020 (Year: 2020).*

(Continued)

*Primary Examiner* — Laurie A Ries

(57) ABSTRACT

Provided are a character display method and apparatus, an electronic device, and a computer-readable storage medium. The character display method includes: receiving a display parameter; obtaining a to-be-displayed character; obtaining a texture of the to-be-displayed character; and displaying the texture of the to-be-displayed character on a screen based on the display parameter and an attribute of the texture of the to-be-displayed character. According to the method, the display parameter is received, and the texture of the to-be-displayed character is drawn based on the display parameter, which can solve the problem of inflexible controlling on the drawing of the character.

19 Claims, 11 Drawing Sheets

(56) References Cited

U.S. PATENT DOCUMENTS

| | | | |
|---|---|---|---|
| 9,953,449 B2* | 4/2018 | Huang | G06T 3/40 |
| 2002/0175928 A1* | 11/2002 | Kanbayashi | G06F 3/0481 |
| | | | 715/700 |
| 2006/0119597 A1* | 6/2006 | Oshino | H04N 13/189 |
| | | | 348/E13.021 |
| 2007/0211062 A1 | 9/2007 | Engelman et al. | |
| 2011/0316886 A1* | 12/2011 | Imai | H04N 21/4821 |
| | | | 345/660 |
| 2012/0182248 A1 | 7/2012 | Kobayashi et al. | |
| 2012/0329561 A1* | 12/2012 | Evans | G16B 50/00 |
| | | | 463/43 |
| 2013/0063464 A1* | 3/2013 | Schneider | G09G 5/00 |
| | | | 345/611 |
| 2017/0249292 A1 | 8/2017 | Constable et al. | |
| 2018/0349444 A1* | 12/2018 | Mulligan | G06F 40/109 |
| 2020/0363929 A1* | 11/2020 | Srinivasan | G06T 15/04 |
| 2022/0021949 A1* | 1/2022 | Hu | A63F 13/5375 |

FOREIGN PATENT DOCUMENTS

| | | | | |
|---|---|---|---|---|
| CN | 104346156 A | | 2/2015 | |
| CN | 105631486 A | | 6/2016 | |
| CN | 106649208 A | * | 5/2017 | |
| CN | 108363792 A | | 8/2018 | |
| CN | 110609981 A | | 12/2019 | |
| CN | 111062186 A | | 4/2020 | |
| CN | 111105474 A | * | 5/2020 | G06T 11/001 |
| CN | 111105474 A | | 5/2020 | |
| CN | 111209721 A | | 5/2020 | |
| CN | 111209721 A | * | 5/2020 | |
| CN | 111222301 A | | 6/2020 | |
| CN | 111222301 A | * | 6/2020 | |
| CN | 108510569 B | * | 11/2020 | G06F 40/109 |
| CN | 112258594 A | | 1/2021 | |
| WO | WO-2020022253 A1 | * | 1/2020 | G09G 3/001 |

OTHER PUBLICATIONS

Xu, Yang, et al, "Research and Implementation of Chinese Characters Display in Ogre-based Virtual Simulation Scenes", 2011 Eighth International Conference on Fuzzy Systems and Knowledge Discovery (FSKD), vol. 4, Jul. 1, 2011, pp. 2553-2556. (Year: 2011).*

Search Report issued Nov. 3, 2021 for PCT Application No. PCT/CN2021/111842, English translation (5 pages).

First Office Action dated Nov. 28, 2023 in CN Appl. No. 202011144913.2, English translation (29 pages).

Extended EP Search Report dated Jan. 8, 2024 in EP Appl. No. 21881658.5 (48 pages).

* cited by examiner

Wo shi yi ming

FIG. 9a

Wo ming shi yi

FIG. 9b

CHARACTER DISPLAY METHOD AND APPARATUS, ELECTRONIC DEVICE, AND COMPUTER-READABLE STORAGE MEDIUM

CROSS-REFERENCE TO RELATED APPLICATIONS

This application claims priority to Chinese Patent Application No. 202011144913.2, filed on Oct. 23, 2020 and entitled with "CHARACTER DISPLAY METHOD AND APPARATUS, ELECTRONIC DEVICE, AND COMPUTER-READABLE STORAGE MEDIUM", the entire content of which is incorporated herein by reference.

FIELD

The present disclosure relates to the field of character composition technologies, and more particularly, to a character display method and apparatus, an electronic device, and a computer-readable storage medium.

BACKGROUND

With the continuous development of computer technology, continuous progress of digital information and accelerated updating of mobile terminal devices are caused. A mobile terminal device such as a tablet computer, a mobile phone, and an electronic reader is widely popularized, and the digital reading mode is rapidly developed, so that information acquisition and learning through the mobile terminal device such as the mobile phone become a choice for more and more people. Characters are also one of the most common ways to acquire information, and therefore displaying the characters on the mobile terminal is one of the basic functions of the mobile terminal.

The current mobile terminal generally displays the characters in a predetermined composition when displaying the characters. For example, lyrics displayed in a music application, subtitles or lyrics displayed in a video application, and the like are generally displayed in a fixed composition. This composition of characters displayed on a screen is not flexibly controlled, and thus the display effect is single.

SUMMARY

The SUMMARY is provided to briefly introduce the concepts, and these concepts will be described in detail in the following DETAILED DESCRIPTION. The SUMMARY is neither intended to identify the key or essential features of the claimed technical solutions, nor intended to limiting the scope of the claimed technical solutions.

In a first aspect, embodiments of the present disclosure provide a character display method. The character display method includes: receiving a display parameter; obtaining a to-be-displayed character; obtaining a texture of the to-be-displayed character; and displaying the texture of the to-be-displayed character on a screen based on the display parameter and an attribute of the texture of the to-be-displayed character.

In a second aspect, embodiments of the present disclosure provide a character display apparatus. The character display apparatus includes: a parameter receiving module configured to receive a display parameter; a character obtaining module configured to obtain a to-be-display character; a texture obtaining module configured to obtain a texture of the to-be-displayed character; and a display module configured to display the texture of the to-be-displayed character on a screen based on the display parameter and an attribute of the texture of the to-be-displayed character.

In a third aspect, embodiments of the present disclosure provide an electronic device. The electronic device includes at least one processor, and a memory in a communication connection with the at least one processor. The memory has instructions stored thereon. The instructions are executable by the at least one processor. The instructions, when executed by the at least one processor, cause the at least one processor to perform any of the character display method in the first aspect.

In a fourth aspect, embodiments of the present disclosure provide a non-transient computer-readable storage medium. The non-transient computer-readable storage medium has computer instructions stored thereon. The computer instructions are configured to cause a computer to perform any of the character display method in the first aspect.

In a fifth aspect, embodiments of the present disclosure provide a character resource package generating method, which includes any of the character display method in the first aspect.

The embodiments of the present disclosure disclose the character display method and apparatus, the electronic device, and the computer-readable storage medium. The character display method includes: receiving a display parameter; obtaining a to-be-displayed character; obtaining a texture of the to-be-displayed character; and displaying the texture of the to-be-displayed character on a screen based on the display parameter and an attribute of the texture of the to-be-displayed character. According to the method, the display parameter is received, and the texture of the to-be-displayed character is drawn based on the display parameter, which can solve the problem of inflexible controlling on the drawing of the character.

The above description is only an overview of the technical solutions of the present disclosure. In order to have a better understanding of the technical features of the present disclosure and implement them in accordance with the contents of the description, and to make the above and other purposes, features and advantages of the present disclosure more obvious and understandable, the following is preferred embodiments, and is described in detail with the accompanying drawings.

BRIEF DESCRIPTION OF THE DRAWINGS

The above and other features, advantages, and aspects of various embodiments of the present disclosure will become more apparent in conjunction with the accompanying drawings and with reference to the following specific embodiments. Throughout the accompanying drawings, the same or similar reference signs indicate the same or similar elements. It should be understood that the accompanying drawings are illustrative, and members and elements are not necessarily drawn to scale.

FIGS. 9a and 9b are schematic diagrams of vertical compositions in which a wrapping operation is and is not performed respectively according to embodiments of the present disclosure, respectively.

DETAILED DESCRIPTION

Figure 1:
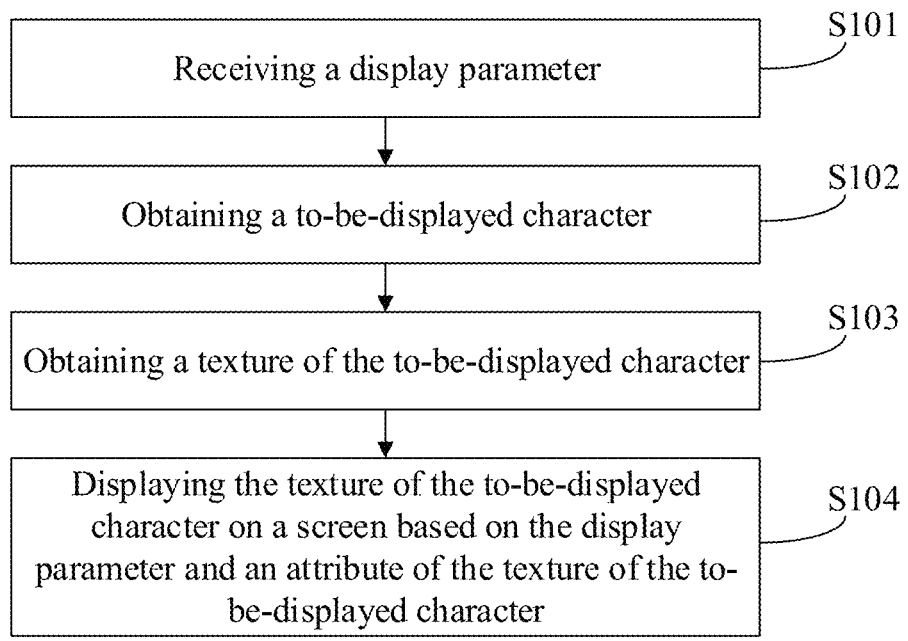
FIG. 1 is a schematic flowchart of a character display method according to an embodiment of the present disclosure.

Embodiments of the present disclosure will be described in detail below with reference to the accompanying drawings. Although some embodiments of the present disclosure are illustrated in the drawings, it should be understood that the present disclosure may be embodied in various forms and should not be construed as being limited to the embodiments set forth herein. Instead, these embodiments are provided for a complete and thorough understanding of the present disclosure. It should be understood that the drawings and embodiments of the present disclosure are only used for exemplary purposes, rather than to limit the protection scope of the present disclosure.

It should be understood the steps described in the method embodiments of the present disclosure may be executed in different sequences and/or in parallel. In addition, method implementations may include additional steps and/or omit executions of the illustrated steps. The scope of the present disclosure is not limited in this respect.

The term "include" and its variants as used herein indicate open-ended inclusions, i.e., "includes but not limited to". The term "based on" refers to "at least partially based on". The term "one embodiment" means "at least one embodiment"; the term "another embodiment" means "at least one additional embodiment"; and the term "some embodiments" means "at least some embodiments". Related definitions of other terms will be given in the following description.

It should be noted that concepts such as "first" and "second" mentioned in the present disclosure are only used to distinguish different apparatuses, modules or units, rather than to limit a sequence or interdependence of functions performed by these apparatuses, modules or units.

It should be noted that modifications such as "a" and "plurality of" mentioned in the present disclosure are schematic instead of restrictive, and should be construed as "one or more" by those skilled in the art, unless otherwise clearly indicated in the context.

Names of messages or information exchanged between apparatuses in the embodiments of the present disclosure are only used for illustrative purposes, rather than limiting the scope of these messages or information.

FIG. 1 is a schematic flowchart of a character display method according to an embodiment of the present disclosure. The character display method according to the present embodiment may be performed by a character display apparatus. The character display apparatus may be implemented as software, hardware, or a combination thereof. The character display apparatus may be integrated into a terminal device of a character display system such as a character display server or a character display terminal device. The character display apparatus may be independently arranged as a terminal device for implementing functions according to various embodiments of the present disclosure. As shown in FIG. 1, the method includes actions at blocks S101 to S103.

At block S101, a display parameter is received.

In some embodiments, the display parameter in the present disclosure may include one or more of an initial origin of a character in a screen, a line width, a character spacing, line spacing, or an alignment style.

In some embodiments, the display parameter may be input by a user.

For example, the character display apparatus may receive the initial origin through a first interaction. For example, the character display apparatus receives a touch signal generated by the user clicking on the screen, to determine a coordinate of the initial origin, and a coordinate of a position where the user clicks on the screen may be determined as the coordinate of the initial origin. The initial origin is an origin of a first character on the screen.

For example, the line width, the character spacing, and the line spacing may be received through a second interaction. For example, the character display device may receive specific values of the line width, the character spacing, and the line spacing input via an input box by the user.

For example, the character display apparatus may receive the alignment style through a third interaction. For example, in the character display apparatus, the alignment style may be selected through a pull-down menu or a selection button.

It should be understood that the above-mentioned interactions are only examples, and the present disclosure does not limit thereto. The above display parameter is only an example and is not intended to limit the present disclosure.

It will be appreciated that default parameter value may be set for the above display parameter, and that the character display apparatus sets the default parameter value as the display parameter when no display parameter is input by the user.

At block S102, a to-be-displayed character is obtained.

Figure 2:
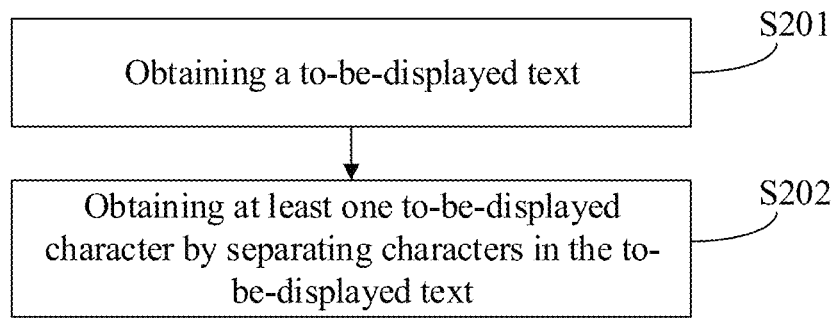
FIG. 2 is a schematic flowchart of an operation of obtaining a to-be-displayed character in a character display method according to an embodiment of the present disclosure.

In some embodiments, as shown in FIG. 2, the operation at block S102 includes actions at blocks S201 and S202.

At block S201, a to-be-displayed text is obtained.

At block S202, at least one to-be-displayed character is obtained by separating characters in the to-be-displayed text.

The to-be-displayed text may be any text. For example, the terminal device may play various multimedia files such as an audio file or a video file. The to-be-displayed text may accordingly include a lyrics file, a subtitle file, etc. input by the user. For example, the character display apparatus may encode characters in the text by using UTF-8, and the characters in the text may be separated and indexed in sequence by using UTF-8 encoding. For example, the character display apparatus puts the characters in the to-be-displayed text into an index table in sequence. In addition, the characters in the to-be-displayed text may also include punctuation marks or other symbols in the text.

In some embodiments, the operation at block S102 may include: receiving a character input by the user; and determining the received input character as the to-be-displayed character.

In the embodiment, by the terminal device, the character input by the user is received through a human-computer interaction interface or device, and the received input character is determined as the to-be-displayed character. For example, by the terminal device, the character input by the user through a keyboard is received, and the input character is determined as the to-be-displayed character. It is understood that the above-mentioned keyboard is only an example, and any other input manner such as input through a touch screen, voice recognition, or the like may be applied to the present disclosure, and the description thereof in detail will be omitted herein.

At block S103, a texture of the to-be-displayed character is obtained.

The texture is an arrangement style of a color and a transparency of a pattern of the to-be-displayed character, and the character can be displayed by rendering the texture onto the screen.

In some embodiments, the operation at block S103 includes: obtaining a character texture atlas; and obtaining the texture of the to-be-displayed character from the character texture atlas.

The character texture atlas is a file in which textures of characters are stored, and the texture of the character is a texture map generated in accordance with a predetermined standard. In this embodiment, texture maps of one or more characters are stored in the texture atlas. After the to-be-displayed character is obtained, the character display apparatus searches for the texture map of the to-be-displayed character from the texture atlas.

In some embodiments, the character display apparatus may further perform, prior to the texture of the to-be-displayed character from the character texture atlas being obtained, operation of obtaining a character mapping relationship table. The character mapping relationship table includes a mapping relationship between a character and a position of the texture of the character in the character texture atlas.

On the basis, the operation of obtaining the texture of the to-be-displayed character from the character texture atlas includes: looking up the character mapping relationship table for a position of the texture of the to-be-displayed character in the character texture atlas; and obtaining the texture of the to-be-displayed character from the character texture atlas based on the position.

In the above embodiment, by the character display apparatus, the to-be-displayed character is converted into an encoding form corresponding to a key in the character mapping relationship table, where the key is a unique identifier of the to-be-displayed character in the character mapping relationship table. For example, the to-be-displayed character is converted into a Unicode encoding form, then a texture position corresponding to the Unicode code of the to-be-displayed character is looked up, and the texture of the to-be-displayed character is obtained from the character texture atlas based on the texture position.

Figure 3A:
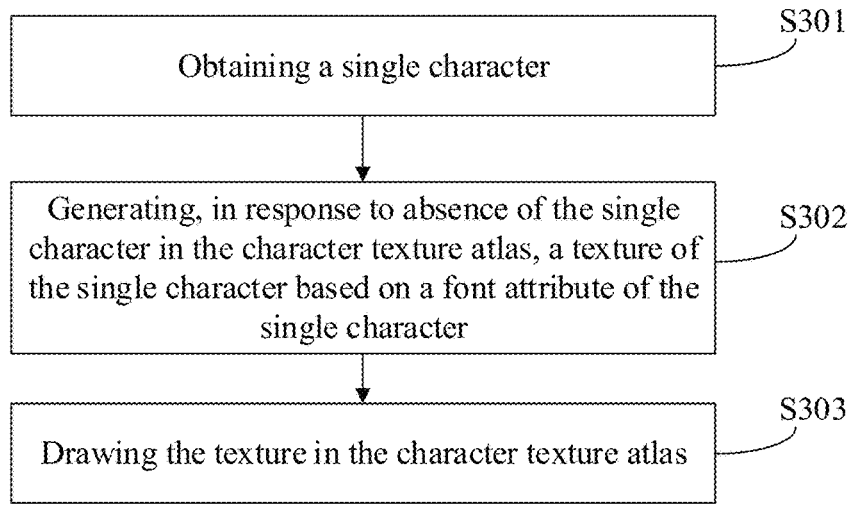
FIG. 3a is a schematic diagram of a step of generating a character texture atlas according to an embodiment of the present disclosure.

In some embodiments, as shown in FIG. 3a, the character texture atlas is generated by operation at blocks 301 to 303.

At block S301, a single character is obtained.

At block S302, in response to absence of the single character in the character texture atlas, a texture of the single character is determined based on a font attribute of the single character.

At block S303, the texture of the single character is drawn in the character texture atlas.

In some embodiments, at block S301, a first text is first obtained. For example, the first text is the to-be-displayed text described at block S201, and by the character display apparatus, the single character is obtained by separating characters from the first text, and then is stored in the index table sequentially based on a position of the single character in the first text. In another embodiment, the operation at block S301 may include obtaining the characters input by the user, and storing the obtained characters into the index table based on an obtaining order.

In some embodiments, at block S302, by the character display apparatus, the single character is sequentially extracted from the index list, and it is looked up the character mapping relationship table whether the single character is already contained in the mapping relationship table. If the single character is already contained, a next single character is continuously obtained from the index list, and continuous looking-up is performed in the character mapping relationship table, until the single character is not contained in the character mapping relationship table. A correspondence between the single character and the texture of the character in the texture atlas is stored in the character mapping relationship table. For example, each item in the character mapping relationship table is a key-value pair, in which the key is a Unicode code of the single character, and a value corresponding to the key is a position of a texture of the single character in the texture atlas.

In some embodiments, at block S302, the single character is converted into the Unicode code form, and it is looked up whether a key corresponding to the Unicode code of the single character exists in the character mapping relationship table. If there is a key corresponding to the Unicode code of the single character in the character mapping relationship table, the next single character is continuously obtained from the index table, and the above conversion and looking-up processes are continued; and if there is no key corresponding to the Unicode code of the single character in the character mapping relationship table, it means that the texture of the single character does not exist in the character texture atlas, and in this case, the texture of the single character is generated based on a predetermined font attribute. Further, the font attribute includes a font size, a font style, and the like.

In some embodiments, at block S303, the texture is drawn onto a character texture atlas canvas. In some embodiments, the texture being drawn onto the character texture atlas canvas is the texture being drawn onto a first empty position of the canvas, and if there is no empty position on a current line on the canvas, the drawing is performed after a wrapping operation. In addition, the empty position represents a position on the canvas at which one character may be contained.

Further, the character texture atlas is generated further by: obtaining a texture position of the texture of the single character in the texture atlas; determining a mapping relationship between the single character and the texture position; and updating the character mapping relationship table based on the mapping relationship.

In some embodiments, the texture position is represented by a coordinate of a texture origin of the texture in the character texture atlas and coordinates of four vertices of a bounding box of the texture. Thereafter, the correspondence between the single character and the texture position is determined to, for example, generate a key-value pair in which the Unicode code of the single character is taken as the key, and the texture position is taken as the value. Then, the mapping relationship is updated as one table item in the character mapping relationship table. The above operations are repeated until all of the characters in the index table are traversed, so that it is possible for the characters in each first text to find the corresponding character texture in the character texture atlas.

It should be understood that, when a new character is encountered, the character texture atlas may be updated at any time through the above operations, and the description thereof in detail will be omitted herein.

Figure 3B:
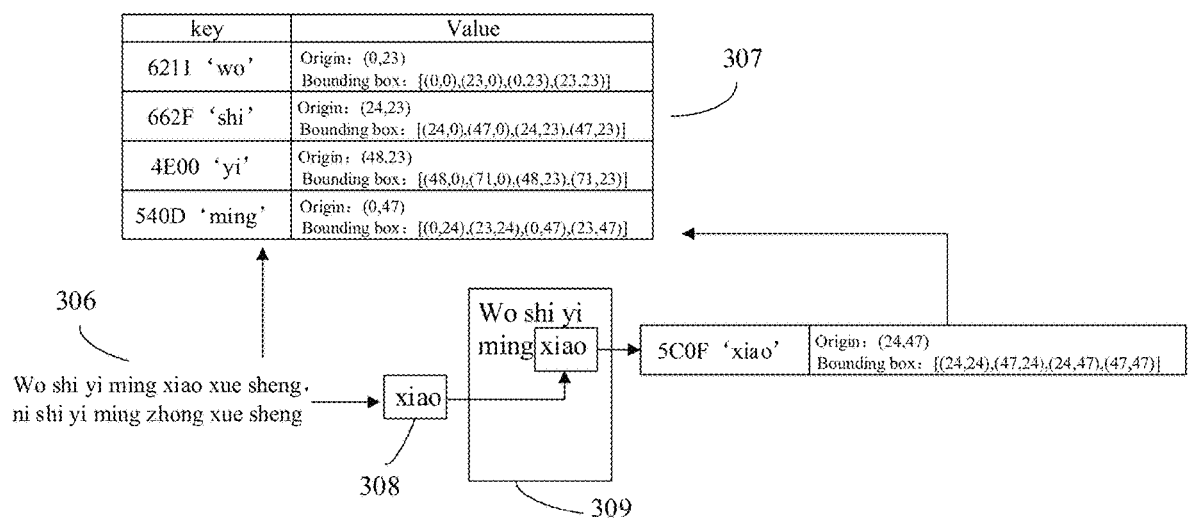
FIG. 3b is a schematic diagram of a process of generating a texture in a character texture atlas according to an embodiment of the present disclosure.

FIG. 3b is an example of a process of generating a texture in a character texture atlas. As shown in FIG. 3b, the first text 306 includes single characters "wo shi yi ming xiao xue sheng, ni shi yi ming zhong xue sheng". When traversing to the character "xiao", the character "xiao" is converted into a corresponding Unicode code 5C0F. The character mapping relationship table 307 is looked up, and there is no Unicode code for the character "xiao" in the character mapping relationship table 307. In this case, a texture 308 of the character "xiao" is generated based on a predetermined font attribute. Then, the texture of the character "xiao" is drawn at a first empty position in the character texture atlas 309, and a position of the texture in the character texture atlas 309 is obtained. The position of the texture in the character texture atlas 309 is that: an origin: (24,47), and a bounding box: [(24,24),(47,24),(24,47),(47,47)]. Thereafter, the Unicode code of the character "xiao" and the position of the character "xiao" in the character texture atlas are determined as a key-value pair and inserted into the character mapping relationship table 307. The character display apparatus continues to traverse the characters in the text, and when traversing to the character "shi" in a second row of the text 306, since a texture position information of the character "shi" is already contained in the character mapping relationship table 307, the character display apparatus directly skips the character "shi" and continues to traverse the next character, for example, the character "yi". After each character in the text is traversed, the texture of each character in the text is drawn to the character texture atlas and the same texture is drawn only once. It may be understood that different character texture atlases may be generated for different first texts, or only one character texture atlas may be generated for all of the first texts. In some embodiments, in order to reduce a size of the character texture atlas loaded each time, the character texture atlas may be divided into a plurality of sub-atlases, and the description thereof will be omitted herein. It will be appreciated that the lower left vertex of the bounding box is set as the texture origin in the example. However, in actual use, any point in the character texture atlas may be set as the texture origin, and the present disclosure is not limited thereto.

The texture of the to-be-displayed character is obtained by taking the example shown in FIG. 3b as an example. When a current to-be-displayed character is the character "ming", the character "ming" is first converted into a Unicode code 540D corresponding to the character "ming", and the character mapping relationship table is looked up for a texture position corresponding to the code 7231. The texture position is that: a texture origin: (0, 47); and a bounding box: [(0,24), (23,24), (0,47), (23,47)]. A texture of the corresponding character "ming" is obtained from the character texture atlas 309 based on the texture position.

In an embodiment, when obtaining the character texture from the character texture atlas, there is a possibility that the texture of the to-be-displayed character cannot be obtained. For example, when generating the character texture atlas, the first text is not the to-be-displayed text. In this case, not all of the characters in the to-be-displayed text may be contained in the character texture atlas. In this case, the texture of the to-be-displayed character may be first added to the character texture atlas in accordance with operations at blocks S301 to S305, and then the operation at block S104 is performed to obtain the texture, and the description thereof in detail will be omitted herein.

At block S104, the texture of the to-be-displayed character is displayed on the screen based on the display parameter and an attribute of the texture of the to-be-displayed character.

Figure 4:
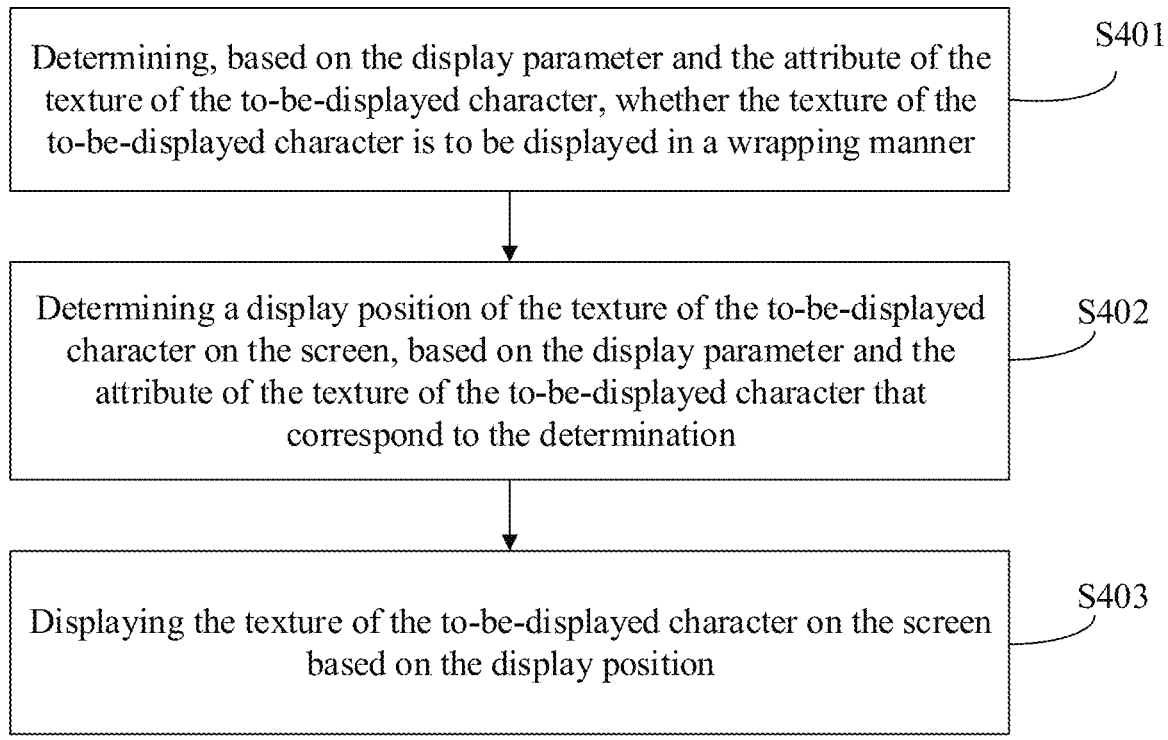
FIG. 4 is a schematic flowchart of an operation of displaying a to-be-displayed character in a character display method according to an embodiment of the present disclosure.

In some embodiments, as shown in FIG. 4, the operation at block S105 includes actions at blocks S401 to S403.

At block S401, it is determined based on the display parameter and the attribute of the texture of the to-be-displayed character whether the texture of the to-be-displayed character is to be displayed on the screen in a wrapping manner.

At block S402, a display position of the texture of the to-be-displayed character on the screen is determined based on a display parameter and an attribute of the texture of the to-be-displayed character that correspond to the determination.

At block S403, the texture of the to-be-displayed character is displayed on the screen based on the display position.

Since a plurality of to-be-displayed characters may be included, and a limited number of characters may be displayed in one line on the screen, when determining the display position of the to-be-displayed character, it is necessary to determine whether the wrapping operation is performed.

Figure 5:
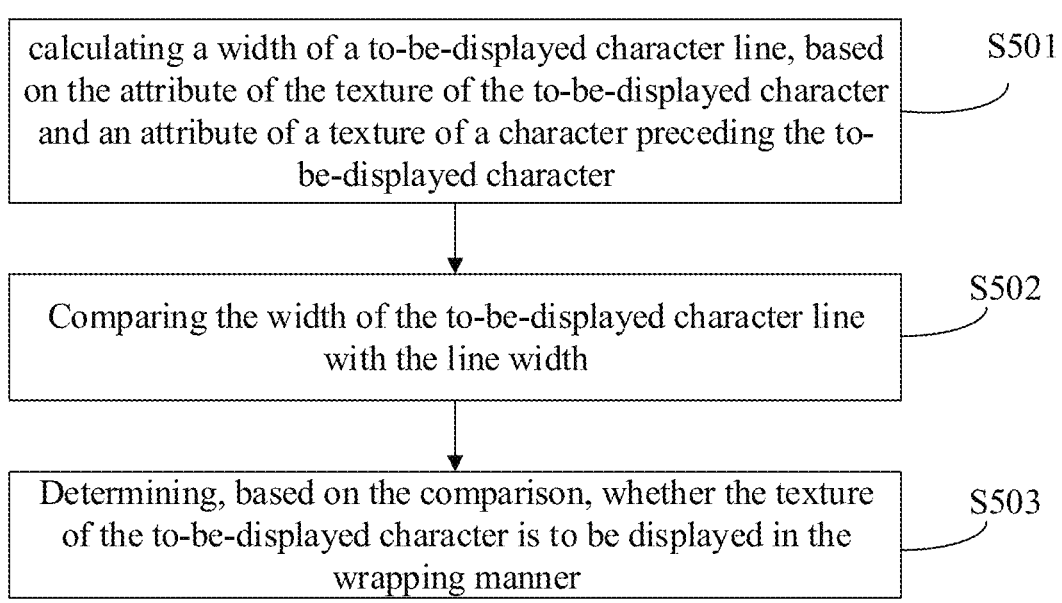
FIG. 5 is a schematic flowchart of an operation of determining whether display is performed in a wrapping manner in a character display method according to an embodiment of the present disclosure.

In some embodiments, the display parameter includes a line width MaxWidth, and the line width defines a maximum width of a character line. In this case, as shown in FIG. 5, the operation at block S401 includes actions at blocks S501 to S503.

At block S501, a width of a to-be-displayed character line is calculated based on the attribute of the texture of the to-be-displayed character and an attribute of a texture of a character preceding the to-be-displayed character.

At block S502, the width of the to-be-displayed character line is compared with the line width.

At block S503, it is determined based on the comparison whether the texture of the to-be-displayed character is to be displayed in the wrapping manner.

The width of the to-be-displayed character line is a pre-determined width. That is, the width of the to-be-displayed character line to which the to-be-displayed character is added is calculated by adding an attribute of a texture of a character preceding the to-be-displayed character to the attribute of the texture of the to-be-displayed character (for example, the size of the texture). After the width of the to-be-displayed character line is obtained, the width of the to-be-displayed character line is compared with the line width, and it is determined based on the comparison whether the wrapping operation is performed.

Figure 6A:
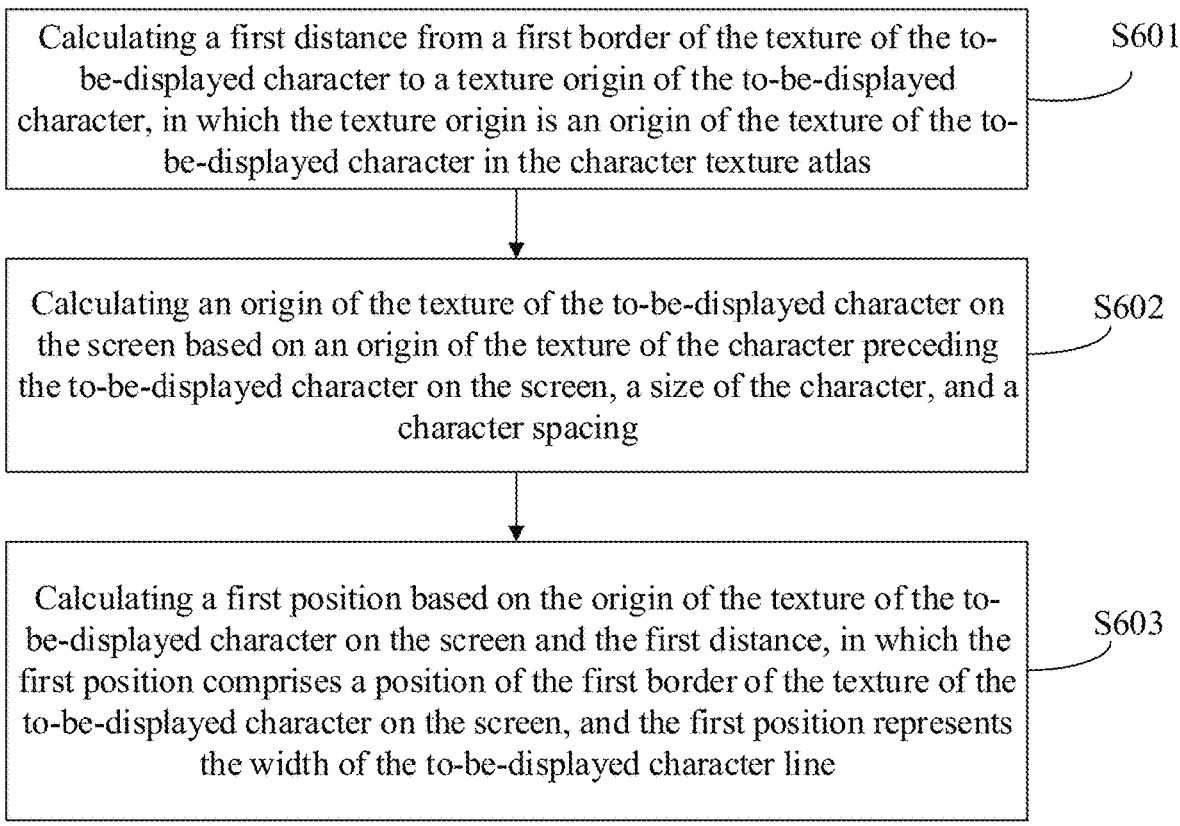
FIG. 6a is a schematic flowchart of an operation of calculating a width of a to-be-displayed character line in a character display method according to an embodiment of the present disclosure.

In some embodiments, as shown in FIG. 6a, the operation at block S501 includes actions at blocks S601 to S603.

At block S601, a first distance from a first border of the texture of the to-be-displayed character to a texture origin of the to-be-displayed character is calculated, in which the texture origin is an origin of the texture of the to-be-displayed character in the texture atlas.

At block S602, an origin of the texture of the to-be-displayed character on the screen is calculated based on an origin of the texture of the character preceding the to-be-displayed character on the screen, a size of the character, and a character spacing.

At block S603, a first position is calculated based on the origin of the texture of the to-be-displayed character on the screen and the first distance, in which the first position includes a position of the first border of the texture of the to-be-displayed character on the screen, and the first position represents the width of the to-be-displayed character line.

In this embodiment, the attribute of the texture of the to-be-displayed character includes a position of the texture origin, positions of the four vertices of the bounding box, and the like, and the first border is a right border of the texture of the to-be-displayed character.

For convenience of description, the to-be-displayed character is denoted as an i-th character on the screen, $A^i$ represents the position of the texture origin of the texture of the to-be-displayed character in the character texture atlas, $BBox_1^i$ represents a position of the bounding box of the texture of the to-be-displayed character in the character texture atlas, which includes positions of four borders, and the four borders are top, bottom, left, and right borders, respectively.

Figure 6B:
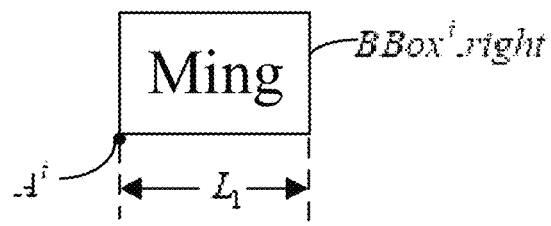
FIG. 6b is a schematic diagram of a first distance according to an embodiment of the present disclosure.

At block S601, the first distance from the right border of the texture of the to-be-displayed character to the texture origin of the to-be-displayed character is calculated. That is, the first distance is denoted as $L_1$, which is calculated as follows.

$$L_1 = BBox_1^i \cdot right - A^i \cdot x \quad (1)$$

where $BBox_1^i \cdot right$ represents an x-axis coordinate of the position of the right border of the texture, and $A^i \cdot x$ represents an x-axis coordinate of the texture origin. FIG. 6b is a schematic diagram of the first distance $L_1$. In this example, for the description below, the texture origin is a lower left vertex of the bounding box of the texture. However, any point in the texture atlas may be actually set as the position of this texture origin, and the present disclosure is not limited thereto.

In some embodiments, at block S602, the origin of the texture of the to-be-displayed character on the screen is denoted as $O^i$, an origin of the character preceding the to-be-displayed character on the screen is denoted as $O^{i-1}$, a size of the character is denoted as fontSize, and a character spacing is denoted as letterSpacing. Therefore, $O^i \cdot x$ is calculated as follows.

$$O^i \cdot x = O^{i-1} \cdot x + fontSize + letterSpacing$$

At block S503, the position of the right border of the texture on the screen is calculated after the texture of the to-be-displayed character is drawn on the screen. The origin of the texture of the to-be-displayed character on the screen is denoted as $O^i$, and the right border on the screen is denoted as $BBox_2^i \cdot right$, which is calculated as follows.

$$BBox_2^i \cdot right = O^i \cdot x + L_1 \quad (2)$$

Figure 6C:
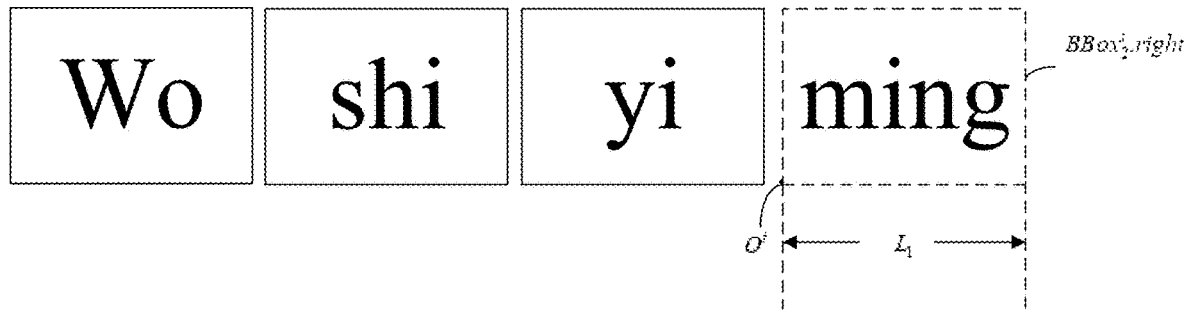
FIG. 6c is a schematic diagram of a first position of a to-be-displayed character in a screen according to an embodiment of the present disclosure.

Thus, a pre-calculation may be performed to calculate the position of the right border of the to-be-displayed character when the to-be-displayed character is drawn on the screen. The position of the right border $BBox_2^i \cdot right$ is shown in FIG. 6c. That is, the first position represents the width of the to-be-displayed character line.

Figure 7:
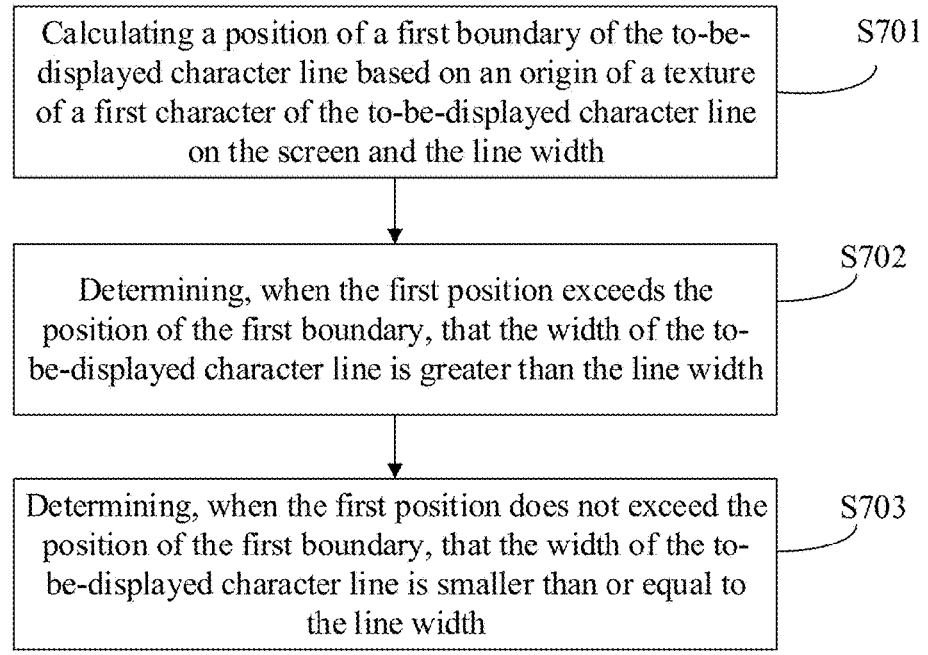
FIG. 7 is a schematic flowchart of an operation of comparing a width of a to-be-displayed character line with a line width according to an embodiment of the present disclosure.

In some embodiments, as shown in FIG. 7, the operation at block 502 includes actions at blocks 701 to 703.

At block S701, a position of a first boundary of the to-be-displayed character line is determined based on an origin of a texture of a first character of the to-be-displayed character line on the screen and the line width.

At block S702, when the first position exceeds the position of the first boundary, it is determined that the width of the to-be-displayed character line is greater than the line width.

At block S703, when the first position does not exceed the position of the first boundary, it is determined that the width of the to-be-displayed character line is smaller than or equal to the line width.

At block S701, the position of the first boundary of the to-be-displayed character line is calculated based on the origin of the texture of the first character of the to-be-displayed character line on the screen and the line width MaxWidth, in which the position of the first boundary represents a boundary of the to-be-displayed character line on the screen. In this embodiment, the first boundary represents a position of a rightmost end of the to-be-displayed character line. It will be appreciated that this operation at block S701 may be performed upon the origin of the first character of the character line is determined, to calculate the position of the rightmost end of the to-be-displayed character line. Therefore, this position may be stored as a constant in a case of the wrapping operation is not required. An index of the first character of the to-be-displayed character line is denoted as c, an x-axis coordinate of the origin of the first character is denoted as $O^c \cdot x$, and the position of the rightmost end of the to-be-displayed character line is denoted as line·x, which is calculated as follows.

$$line \cdot x = O^c \cdot x + MaxWidth \quad (3)$$

Typically, the display parameter includes an initial origin provided by the user, and the initial origin is used as the position of the origin of the texture of a first one of the to-be-displayed characters on the screen. A coordinate of the initial origin is denoted as $0° = (x_0, y_0)$, and then $O^c \cdot x = x_0$. The line width of the display parameter is denoted as MaxWidth. Therefore, in this case:

$$line \cdot x = x_0 + MaxWidth \quad (4)$$

If the texture origin is not located on the left border of the texture, an offset needs to be calculated first, and then MaxWidth is added to determine line·x as follows.

$$line \cdot x = O^c \cdot x - (A^c - BBox_1^c \cdot left) + MaxWidth \quad (5)$$

where $A^c - BBox_1^c \cdot left$ represents the offset, which represents a distance from the texture origin to the left border of the texture in the texture atlas.

For the sake of discussion, the case of the above formula (4) will be discussed as an example later.

In the above operations at blocks S702 and S703, it can be determined by comparing the magnitudes of formulas (2) and (4) whether the line width of the character line is exceeded when the texture of the to-be-displayed character is drawn on the screen. That is, it is determined whether the condition $BBox_2^i \cdot right > line \cdot x$ holds. If the condition holds, the width of the character line with the drawn to-be-displayed character will exceed a predetermined line width; and if the condition does not hold, the width of the line with the drawn to-be-displayed character does not exceed the predetermined line width.

In the above operations, the width of the to-be-displayed character line is compared with the line width by comparing the position of the boundary. In some embodiments, the width of the to-be-displayed character line may also be directly compared with the line width to obtain the comparison result. The position of the right border of the to-be-displayed character line may be calculated through the above operations. Then, an actual width $BBox_2^i \cdot right - x_0$ of the to-be-displayed character line is calculated by using the x-axis coordinate $x_0$ of the initial origin and the position of the right border $BBox_2^i \cdot right$. Thereafter, $BBox_2^i \cdot right - x_0$ and MaxWidth are directly compared with each other in magnitude. That is, it is determined whether the condition $BBox_2^i \cdot right - x_0 > MaxWidth$ holds. If the condition holds, the width of the character line with the drawn to-be-displayed character will exceed the predetermined line width; and if the condition does not hold, the width of the line with the drawn to-be-displayed character does not exceed the predetermined line width.

In some embodiments, the operation at block 503 includes: determining, when the width of the to-be-displayed character line is smaller than or equal to the line width, that the texture of the to-be-displayed character is to be displayed in an unwrapping manner; and determining, when the width of the to-be-displayed character line is greater than the line width, that the texture of the to-be-displayed character is to be displayed in the wrapping manner.

That is, when the width of the to-be-displayed character line is smaller than or equal to the line width, the texture of the to-be-displayed character is to be drawn on the screen in the unwrapping manner; and when the width of the to-be-displayed character line is greater than the line width, the texture of the to-be-displayed character is to be drawn on the screen in the wrapping manner.

Figure 8A:
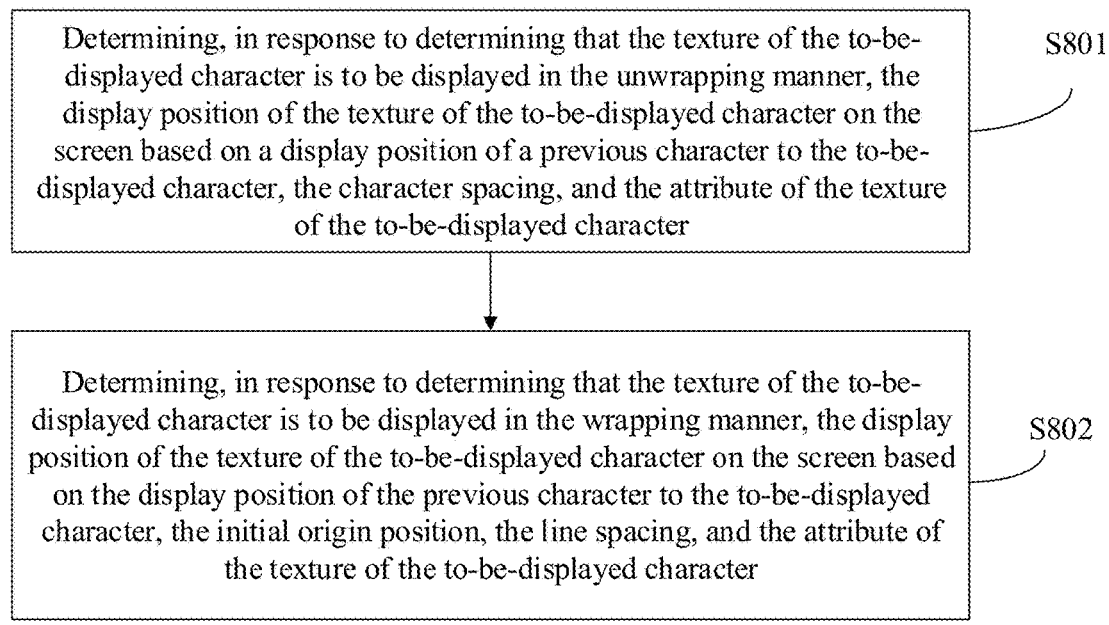
FIG. 8a is a schematic flowchart of an operation of determining a display position of a texture of a to-be-displayed character in a screen according to an embodiment of the present disclosure.

In some embodiments, the display parameter includes a character spacing, an initial origin position, and a line spacing. As shown in FIG. 8a, the operation at block S402 includes actions at blocks S801 and S802.

At block S801, in response to determining that the texture of the to-be-displayed character is to be displayed in the unwrapping manner, the display position of the texture of the to-be-displayed character on the screen is determined based on a display position of a previous character to the to-be-displayed character, the character spacing, and the attribute of the texture of the to-be-displayed character.

At block S802, in response to determining that the texture of the to-be-displayed character is to be displayed in the wrapping manner, the display position of the texture of the to-be-displayed character on the screen is determined based on the display position of the previous character to the to-be-displayed character, the initial origin position, the line spacing, and the attribute of the texture of the to-be-displayed character.

Figure 8B:
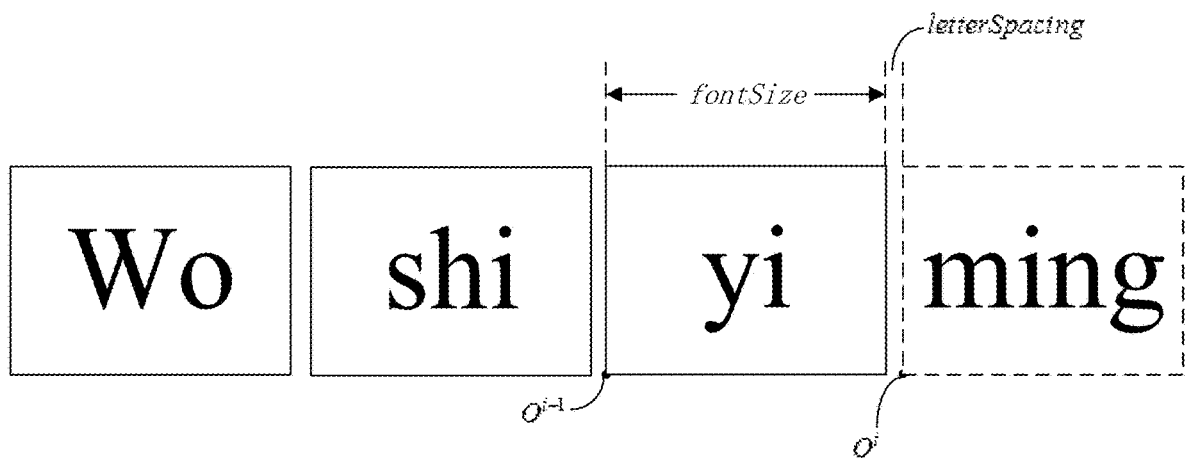
FIG. 8b is a schematic flowchart of calculating a display position in a case of unwrapping according to an embodiment of the present disclosure.

At block S801, in response to determining that the texture of the to-be-displayed character is to be displayed in the unwrapping manner, the display position of the texture of the to-be-displayed character on the screen is determined based on the display parameter. In this operation, since the display position of the previous character to the to-be-displayed character is known, the display position of the texture of the to-be-displayed character can be calculated from the display parameter and the attribute of the character. Exemplarily, the display position is a position of the origin of the texture of the to-be-displayed character on the screen, and the attribute of the character is a size of the character, which is denoted as fontSize. Therefore, the display position is calculated as follows.

$$O^i \cdot x = + O^{i-1} \cdot x + fontSize + letterSpacing$$

$$O^i \cdot y = O^{i-1} \cdot y \qquad (6)$$

where $O^i \cdot x$ and $O^i \cdot y$ represent an x coordinate and a y coordinate of the origin of the texture of the current to-be-displayed character on the screen, respectively, $O^{i-1} \cdot x$ and $O^{i-1} \cdot y$ represent an x coordinate and a y coordinate of the origin of the texture of the previous character on the screen, respectively, and fontSize represents the size of the texture of the previous character. Exemplarily, taking the example in FIG. 3b as an example, the fontSize is 24 for all of the characters. That is, the size of the texture in the character texture atlas is a size of 24*24 pixels. It should be understood that fontSize herein may also indicate sizes of other symbols, such as punctuation marks or other special symbols, etc. The sizes of the textures of the other symbols may be the same as or different from the size of the texture of the character, and the present disclosure is not limited thereto. letterSpacing is the character spacing of the display parameter. FIG. 8b is an example of calculating the display position in a case of unwrapping. As shown in FIG. 8b, the display position of the texture of the to-be-displayed character can be calculated by using the calculation method in the above formula (6) based on the origin of the texture of the previous character on the screen, the size of the character, and the character spacing, since the to-be-displayed characters are located in the same character line.

Figure 8C:
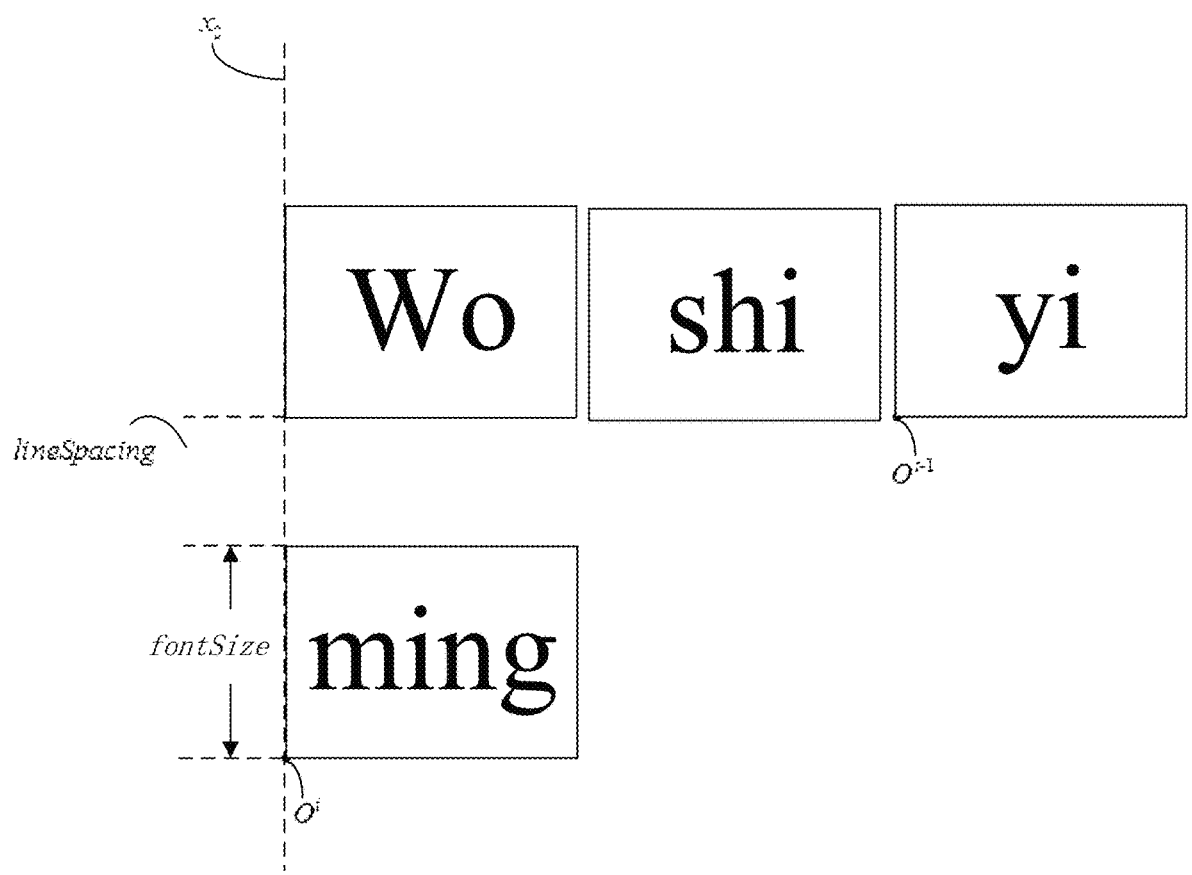
FIG. 8c is a schematic flowchart of calculating a display position in a case of wrapping according to an embodiment of the present disclosure.

At block S802, in response to determining that the texture of the to-be-displayed character is to be displayed in the wrapping manner, the wrapping operation is performed. Since the wrapping operation is required, $O^i \cdot x$ may be directly set as the x coordinate of the initial origin position, i.e., $x_0 \cdot O^i \cdot y$ may be obtained by adding the font size and the line spacing to the y coordinate of the origin of a previous to-be-displayed character. That is, for the case where the wrapping operation is required, $O^i$ is calculates as follows.

$$O^i \cdot y = O^{i-1} \cdot y + fontSize + lineSpacing$$

$$O^i \cdot x = x_0 \qquad (7)$$

where lineSpacing is the line spacing of the display parameter. FIG. 8c is an example of calculating a display position in a case of wrapping. As shown in FIG. 8c, since the wrapping operation is required, the display position of the texture of the wrapped to-be-displayed character can be calculated by using the calculation method in the above formula (7) based on the display position of the texture of the previous character, the initial origin position, the font size, and the line spacing.

After the display position of the texture of the to-be-displayed character is obtained according to the formula (6) or (7), at block S403, the texture of the to-be-displayed character is displayed on the screen based on the display position. Exemplarily, the display position is the position of the origin of the to-be-displayed character on the screen, and the operation of displaying the texture of the to-be-displayed character on the screen is mapping the texture origin of the to-be-displayed character to the position of the origin of the to-be-displayed character on the screen, to display the texture of the to-be-displayed character on the screen. In some embodiments, the display parameter further includes an alignment style, and in this case, the operation at block S104 further includes: determining an offset of the display position based on the alignment style of the display parameter; and displaying the texture of the to-be-displayed character on the screen based on the display position and the offset.

In the above embodiment, a left-alignment is defaulted. That is, when the left-alignment is set as the alignment style, then the offset is 0, and the texture of the to-be-displayed character is displayed directly at the display position. For other alignment styles, an offset from the left-alignment to another alignment is calculated based on the left-alignment, to adjust the to-be-displayed character line. Specifically, when the alignment style is a right-alignment, a difference between the width of the to-be-displayed character line and MaxWidth is calculated, and the to-be-displayed character line is shifted rightwards as a whole by a distance corresponding to this difference to obtain the right-aligned to-be-displayed character line. When the alignment style is a both-ends-alignment, the difference between the width of the to-be-displayed character line and MaxWidth is also calculated, and then the difference is assigned to each character interval to enable the width of the to-be-displayed character line to be equal to MaxWidth. When the alignment style is a center-alignment, a center of the to-be-displayed character line is adjusted to a center between $x_0$ and line·x. In the case where alignment needs to be adjusted, it is also necessary to record a header index of each to-be-displayed character line to determine an adjusting range of the character line. Exemplarily, after the position of the initial origin is obtained from the display parameter, the header index is recorded as c=0, and thereafter c=i is updated each time the wrapping is required, to calculate a length of the character line when adjusting the alignment.

According to the above character display method, after the text display parameter is received, the to-be-displayed character is obtained, and the texture of the to-be-displayed character is obtained, to display the texture on the corresponding position of the screen based on the display parameter, thereby allowing the user to flexibly control the display of the character through the character display parameter to form various customized character composition effects.

Figure 9A:
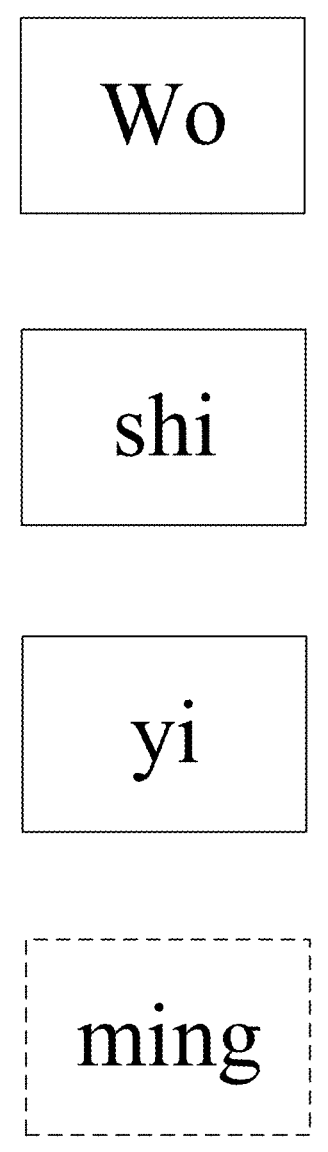
Figure 9B:
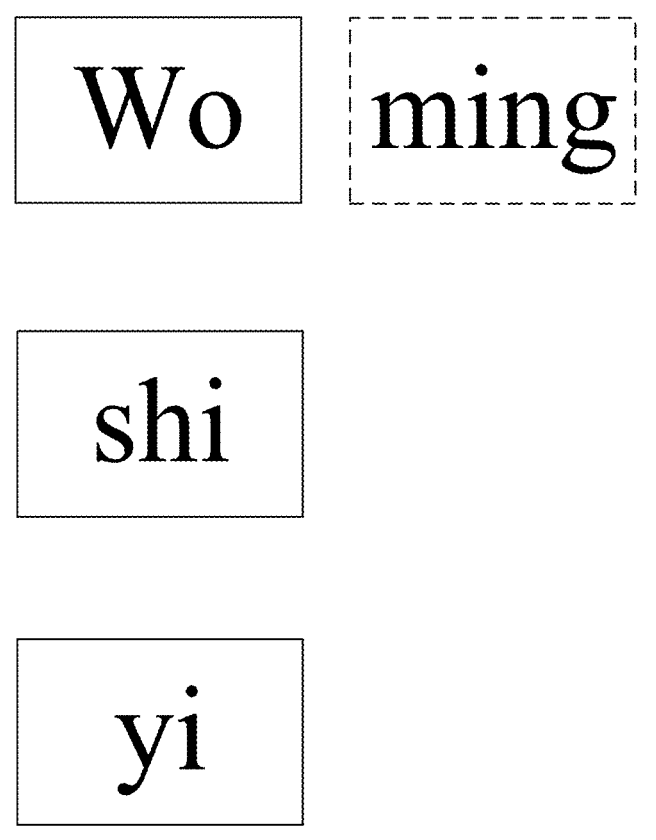

It should be understood that the above embodiment illustrates how to control the character composition through the character display parameter by taking a horizontal composition as an example. In fact, the technical solution of the present disclosure may also be implemented in a form of a vertical composition. FIGS. 9a and 9b are schematic diagrams of the vertical composition, in which FIG. 9a is a schematic diagram of the vertical composition in which a text column is not wrapped, and 9b is schematic diagram of the vertical composition in which the text column is wrapped. In this case, the line spacing is replaced with a column spacing, and the to-be-displayed character line is replaced with a to-be-displayed character column, the width of the to-be-displayed character line is replaced with a length of the to-be-displayed character column, and the line width is replaced with a column length. In the calculation process, an x-axis coordinate of each to-be-displayed character column is not changed, only a y-axis coordinate is changed; and only when the column is wrapped, the x-axis coordinate of the to-be-displayed character is changed. A logic of the column wrapping is similar to that of the line wrapping, and thus the description thereof in detail will be omitted herein.

Figure 10:
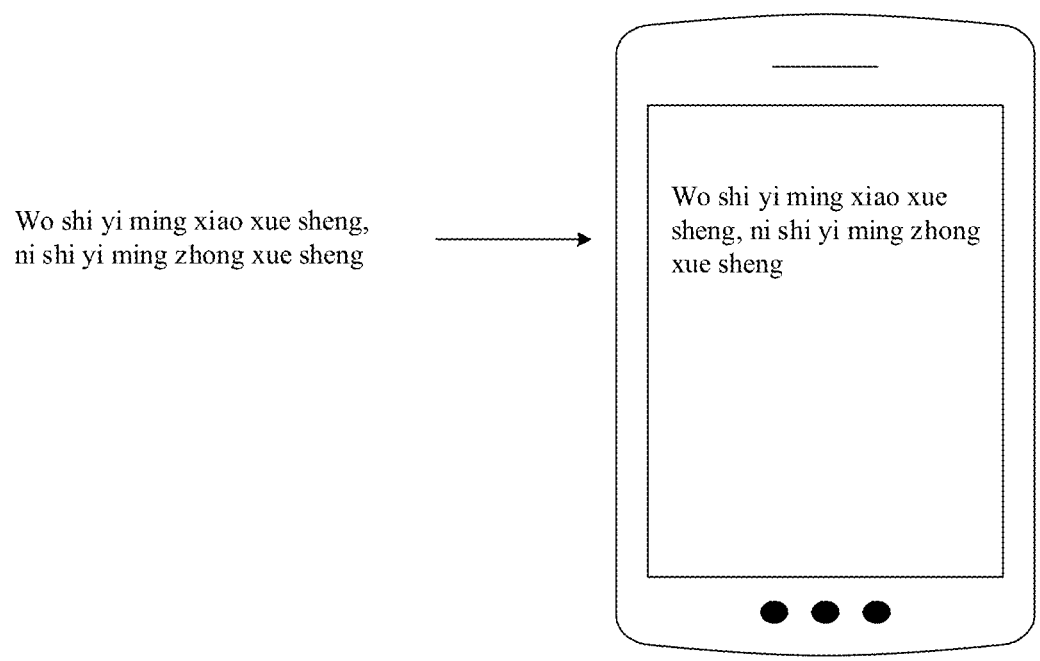
FIG. 10 is a schematic diagram of an application scenario according to an embodiment of the present disclosure.

It should be understood that in the above embodiments, the to-be-displayed character can be displayed by obtaining one to-be-displayed character, i.e., displaying the one to-be-displayed character. Exemplarily, in response to the to-be-displayed text being obtained or the to-be-displayed character being obtained by an input signal, one character is displayed upon obtained; or in the above embodiments, the to-be-displayed character may be displayed on the screen after positions of all of the to-be-displayed characters are determined, for example, after all of the to-be-displayed characters in the to-be-displayed text are obtained. An array of the display origins of all of the to-be-displayed characters on the screen is determined by the above-mentioned operations, and then all of the to-be-displayed characters are displayed on the screen once. FIG. 10 is a schematic diagram of an application scenario of the present disclosure, and shows a schematic diagram of performing the display in the mobile terminal by the character display method as described above. During the use, when characters "wo shi yi ming xiao xue sheng, ni shi yi ming zhong xue sheng" are inputs by the suer, or when a text including the characters "wo shi yi ming xiao xue sheng, ni shi yi ming zhong xue sheng" is received by the mobile terminal, the text can be displayed on the screen of the mobile terminal by the method according to the above embodiments.

According to the above embodiments, the character display method includes: receiving a display parameter; obtaining a to-be-displayed character; obtaining a texture of the to-be-displayed character; and displaying the texture of the to-be-displayed character on a screen based on the display parameter and an attribute of the texture of the to-be-displayed character. According to the above method, the display parameter is received, and the texture of the to-be-displayed character is drawn based on the display parameter, which can solve the problem of inflexible controlling on the drawing of the character.

Although various steps of the above method embodiments are described in the above order, those skilled in the art should understand that the steps according to the embodiments of the present disclosure are not necessarily performed in the above order, and they may be performed in a reversed, parallel, interleaved, or other orders. In addition, on the basis of the above steps, those skilled in the art may add other steps. These obvious modifications or equivalents shall fall within the scope of the present disclosure, and the description thereof in detail will be omitted herein.

Figure 11:
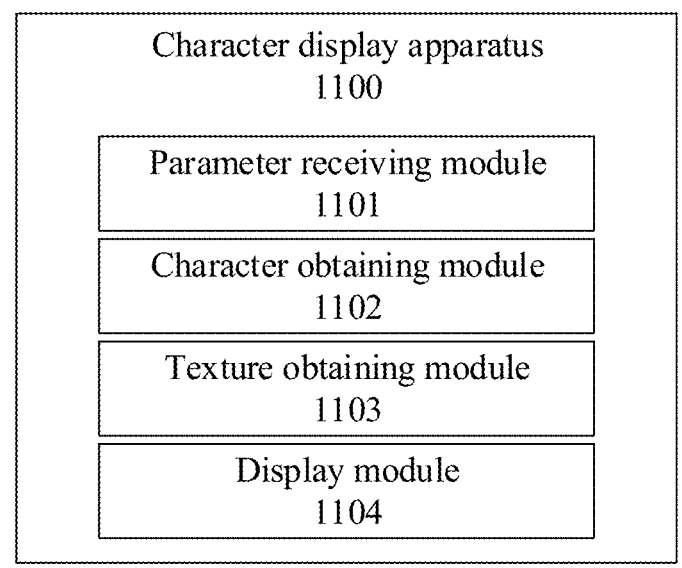
FIG. 11 is a schematic structural diagram of a character display apparatus according to an embodiment of the present disclosure.

FIG. 11 is a schematic structural diagram of a character display apparatus according to an embodiment of the present disclosure. As shown in FIG. 11, the apparatus 1100 includes: a parameter receiving module 1101, a character obtaining module 1102, a texture obtaining module 1103, and a display module 1104.

The parameter receiving module 1101 is configured to receive a display parameter.

The character obtaining module 1102 is configured to obtain a to-be-display character.

The texture obtaining module 1103 is configured to obtain a texture of the to-be-displayed character.

The display module 1104 is configured to display the texture of the to-be-displayed character on a screen based on a display parameter and an attribute of the texture of the to-be-displayed character.

Further, the character obtaining module 1102 is further configured to: obtain a to-be-displayed text; and obtain at least one to-be-displayed character by separating characters in the to-be-displayed text.

Further, the texture obtaining module 1103 is further configured to: obtain a character texture atlas; and obtain the texture of the to-be-displayed character from the character texture atlas.

Further, the character display apparatus 1100 further includes a relationship table obtaining module configured to obtain a character mapping relationship table.

The texture obtaining module 1103 is further configured to: look up the character mapping relationship table for a position of the texture of the to-be-displayed character in the character texture atlas; and obtain the texture of the to-be-displayed character from the character texture atlas based on the position. The character mapping relationship table includes a mapping relationship between a character and a position of a texture of the character in the character texture atlas.

Further, the character texture atlas is generated by obtaining a single character, generating, in response to lacking of the single character in the character texture atlas, a texture of the single character based on a font attribute of the single character, and drawing the texture of the single character in the character texture atlas.

Further, the character texture atlas is generated further by: obtaining a texture position of the texture of the single character in the texture atlas; determining a mapping relationship between the single character and the texture position; and updating the character mapping relationship table based on the mapping relationship.

Further, the display module 1104 is further configured to: determine, based on the display parameter and the attribute of the texture of the to-be-displayed character, whether the texture of the to-be-displayed character is to be displayed in a wrapping manner; determine a display position of the texture of the to-be-displayed character on the screen based on a display parameter and an attribute of the texture of the to-be-displayed character that correspond to the determination; and display the texture of the to-be-displayed character on the screen based on the display position.

Further, the display parameter includes a line width. The display module 1104 is further configured to: calculate a width of a to-be-displayed character line based on the attribute of the texture of the to-be-displayed character and an attribute of a texture of a character preceding the to-be-displayed character; compare the width of the to-be-displayed character line with the line width; and determine, based on the comparison, whether the texture of the to-be-displayed character is to be displayed in the wrapping manner.

Further, the display module 1104 is further configured to: determine, when the width of the to-be-displayed character line is smaller than or equal to the line width, that the texture of the to-be-displayed character is to be displayed in the unwrapping manner; and determine, when the width of the to-be-displayed character line is greater than the line width, that the texture of the to-be-displayed character is to be displayed in the wrapping manner.

Further, the display parameter includes a character spacing, an initial origin position, and a line spacing. The display module 1104 is further configured to: determine, in response to determining that the texture of the to-be-displayed character is to be displayed in the unwrapping manner, the display position of the texture of the to-be-displayed character on the screen, based on a display position of a previous character to the to-be-displayed character, the character spacing, and the attribute of the texture of the to-be-displayed character; and determine, in response to determining that the texture of the to-be-displayed character is to be displayed in the wrapping manner, the display position of the texture of the to-be-displayed character on the screen, based on the display position of the previous character to the to-be-displayed character, the initial origin position, the line spacing, and the attribute of the texture of the to-be-displayed character.

Further, the display module 1104 is further configured to: calculate a first distance from a first border of the texture of the to-be-displayed character to a texture origin of the to-be-displayed character, the texture origin being an origin of the texture of the to-be-displayed character in a texture atlas; calculate an origin of the texture of the to-be-displayed character on the screen, based on an origin of the texture of the character preceding the to-be-displayed character on the screen, a size of the character, and the character spacing; and calculate a first position, based on the origin of the texture of the to-be-displayed character on the screen and the first distance, the first position including a position of the first border of the texture of the to-be-displayed character on the screen, and the first position representing the width of the to-be-displayed character line.

Further, the display module 1104 is further configured to: calculate a position of a first boundary of the to-be-displayed character line based on an origin of a texture of a first character of the to-be-displayed character line on the screen and the line width; determine, when the first position exceeds the position of the first boundary, that the width of the to-be-displayed character line is greater than the line width; and determine, when the first position does not exceed the position of the first boundary, that the width of the to-be-displayed character line is smaller than or equal to the line width.

Further, the display parameter includes an alignment style. The display module 1104 is further configured to: determine an offset of the display position based on the alignment style of the display parameter; and display the texture of the to-be-displayed character on the screen based on the display position and the offset.

The apparatus shown in FIG. 11 may perform the method of the embodiments shown in FIGS. 1 to 9*b*, and the parts of the present embodiments not described in detail, may refer to the relevant description of the embodiments shown in FIGS. 1 to 9*b*. The performing process and technical effect of the technical solution are described in the embodiments shown in FIGS. 1 to 9*b*, and the description thereof in detail will be omitted herein.

The embodiment of the disclosure provides a character resource package generating method including the character display method as described in the above embodiments. The character resource package is configured to provide the character display function in the terminal device. Exemplarily, a client is operated in the terminal device. In this case, the character resource package is a resource package for the client, and the client can provide the character display method as described in the above embodiment through the character resource package.

Figure 12:
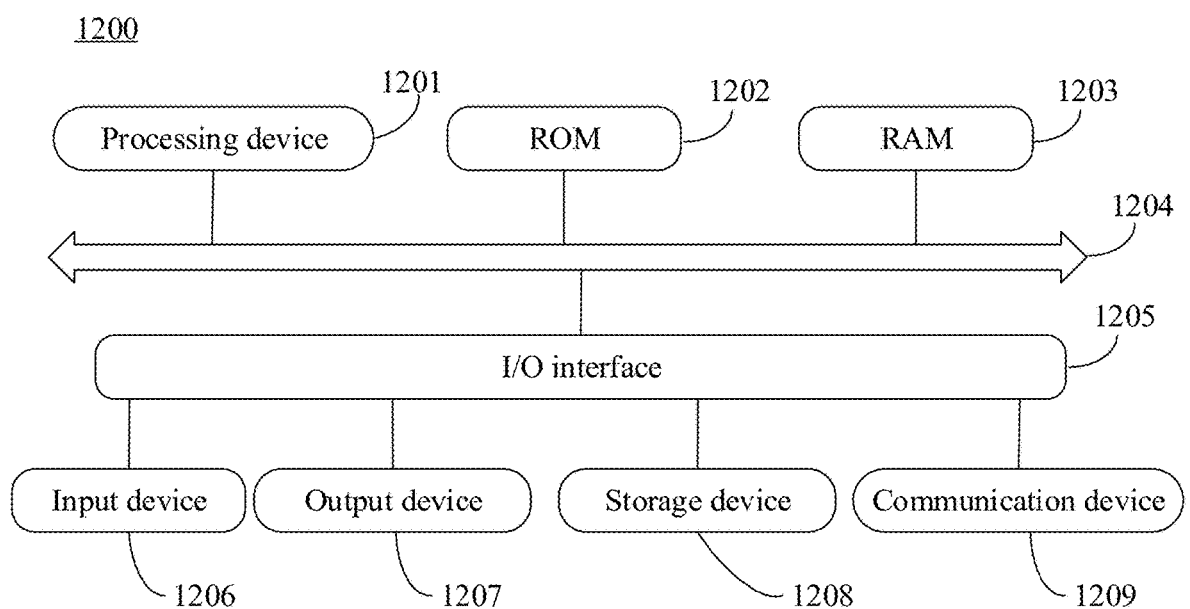
FIG. 12 is a schematic structural diagram of an electronic device according to an embodiment of the present disclosure.

Reference is now made to FIG. 12, which is a schematic diagram showing a structure of an electronic device 1200 adapted to implement the embodiments of the present disclosure. The terminal device according to the embodiments of the present disclosure may include, but not limited to, a mobile terminal such as a mobile phone, a laptop computer, a digital broadcast receiver, a PDA (Personal Digital Assistant), a PAD (Portable Android Device), a PMP (Portable Multimedia Player), or a vehicle-mounted terminal (e.g., a vehicle-mounted navigation terminal), or a fixed terminal such as a digital TV, a desktop computer, etc. The electronic device illustrated in FIG. 12 is exemplary only, and should not be construed as limiting the function and scope of use of the embodiments of the present disclosure.

As illustrated in FIG. 12, the electronic device 1200 may include a processing device (such as a central processing unit, a graphics processing unit, etc.) 1201, which may perform various appropriate actions and processes in accordance with programs stored in a Read-Only Memory (ROM) 1202 or loaded from a storage device 1208 into a Random Access Memory (RAM) 1203. In the RAM 1203, various programs and data required for the operation of the electronic device 1200 may also be stored. The processing device 1201, the ROM 1202, and the RAM 1203 are connected to each other through a bus 1204. An Input/Output (I/O) interface 12012 is also connected to the bus 1204.

Generally, connected to the I/O interface 1205 may include: an input device 1206 including, for example, a touch screen, a touch pad, a keyboard, a mouse, a camera, a microphone, an accelerometer, a gyroscope, etc.; an output device 1207 including, for example, a Liquid Crystal Display (LCD), a speaker, an oscillator, etc.; the storage device 1208 including, for example, a magnetic tape or a hard disk; and a communication device 1209. The communication device 1209 may allow the electronic device 1200 to perform wireless or wired communication with other devices for data exchange. Although FIG. 12 illustrates the electronic device 1200 having various devices, it can be appreciated that it is not necessary to implement or provide all the illustrated devices. Alternatively, more or fewer devices may be implemented or provided.

In particular, according to the embodiments of the present disclosure, the processes described above with reference to the flowcharts may be implemented as computer software programs. For example, an embodiment of the present disclosure includes a computer program product, which includes a computer program carried on a non-transitory computer-readable medium. The computer program includes program codes for implementing the method illustrated in the flowchart. In these embodiments, the computer program may be downloaded and installed from a network through the communication device 1209, or installed from the storage device 1208, or installed from the ROM 1202. When the computer program is executed by the processing device 1201, the above-mentioned functions defined in the methods according to the embodiments of the present disclosure are performed.

It should be noted that in the present disclosure, the above-mentioned computer-readable medium may be a computer-readable signal medium, a computer-readable storage medium, or any combination thereof. The computer-readable storage medium may be, but not limited to, for example, an electrical, magnetic, optical, electromagnetic, infrared, or semiconductor system, apparatus, or device, or any combination thereof. More specific examples of the computer-readable storage medium may include, but not limited to: an electrical connection having one or more wires, a portable computer disk, a hard disk, a RAM, a ROM (Read-Only Memory), an Electrical Programmable Read-Only Memory (EPROM) or a flash memory, an optical fiber, a Compact Disc ROM (CD-ROM), an optical memory device, a magnetic memory device, or any suitable combination thereof. In the present disclosure, the computer-readable storage medium may be any tangible medium including or storing programs, which may be used by or used with an instruction execution system, apparatus, or device. However, in the present disclosure, the computer-readable signal medium may include a data signal propagated in a baseband or as a part of a carrier that carries computer-readable program codes. Such propagated data signal may be in various forms, including, but not limited to, an electromagnetic signal, an optical signal, or any suitable combination thereof. The computer-readable signal medium may also be any computer-readable medium other than the computer-readable storage medium, which may transmit, propagate, or transfer programs used by or used with an instruction execution system, apparatus or device. The program codes contained on the computer-readable medium may be transmitted via any appropriate medium, including but not limited to an electric cable, an optical cable, a Radio Frequency (RF), or any suitable combination thereof.

In some embodiments, the client and the server may communicate using any currently-known or future-developed network protocol, such as HTTP (HyperText Transfer Protocol), and may be in communication interconnection with digital data in any form or medium (e.g., a communication network). Examples of the communication network include a Local Area Network ("LAN"), a Wide Area Network ("WAN"), an Internet work (e.g., the Internet), and an end-to-end network (e.g., ad hoc end-to-end network), as well as any currently-known or future-developed network.

The above computer-readable medium may be included in the above electronic device; or may be standalone without being assembled into the electronic device.

The above computer-readable medium may carry one or more programs which, when executed by the electronic device, cause the terminal device to perform the character display method according to any of the above embodiments.

The computer program codes for implementing the operations of the present disclosure may be written in one or more programming languages or any combination thereof.

The programming languages may include, but not limited to, object-oriented programming languages, such as Java, Smalltalk, or C++, as well as conventional procedure-oriented programming languages, such as "C" language or similar programming languages. The program codes may be executed completely on a user computer, partly on the user computer, as a standalone software package, partly on the user computer and partly on a remote computer, or completely on the remote computer or server. In a case where the remote computer is involved, the remote computer may be connected to the user computer through any types of network, including a Local Area Network (LAN) or a Wide Area Network (WAN), or to an external computer (e.g., over the Internet by using an Internet service provider).

The flowcharts and block diagrams in the drawings illustrate architectures, functions, and operations of possible implementations of systems, methods and computer program products according to various embodiments of the present disclosure. In this regard, each block in the flowcharts or block diagrams may represent a module, a program segment, or a part of codes. The module, program segment, or part of codes may contain one or more executable instructions for implementing a specified logical function. It is also to be noted that, in some alternative implementations, functions showed in blocks may occur in a different order from the order shown in the drawings. For example, two blocks illustrated in succession may actually be executed substantially in parallel with each other, or sometimes even in a reverse order, depending on the involved functions. It is also to be noted that each block in the block diagrams and/or flowcharts, or any combination of the blocks in the block diagrams and/or flowcharts, may be implemented using a dedicated hardware-based system that is configured to perform specified functions or operations or using a combination of dedicated hardware and computer instructions.

Units involved and described in the embodiments of the present disclosure may be implemented in software or hardware. Here, a name of a unit does not constitute a limitation on the unit itself under certain circumstances.

The functions described above may be performed, at least in part, by one or more hardware logic components. For example, without limitation, exemplary types of suitable hardware logic components include a Field Programmable Gate Array (FPGA), an Application Specific Integrated Circuit (ASIC), an Application Specific Standard Product (ASSP), a System on Chip (SOC), a Complex Programmable Logic Device (CPLD), and the like.

In the context of the present disclosure, a machine-readable medium may be a tangible medium, which may contain or store a program for use by or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium would include an electrical connection having one or more wires, a portable computer disk, a hard disk, a Random Access Memory (RAM), a Read-Only Memory (ROM), an Electrical Programmable Read-Only Memory (EPROM), an optical fiber, a Compact Disc ROM (CD-ROM), an optical memory device, a magnetic memory device, or any suitable combination thereof.

According to one or more embodiments of the present disclosure, a character display method is provided. The character display method includes: receiving a display parameter; obtaining a to-be-displayed character; obtaining a texture of the to-be-displayed character; and displaying the texture of the to-be-displayed character on a screen based on the display parameter and an attribute of the texture of the to-be-displayed character.

Further, the obtaining the to-be-displayed character includes: obtaining a to-be-displayed text; and obtaining at least one to-be-displayed character by separating characters in the to-be-displayed text.

Further, the obtaining the texture of the to-be-displayed character includes: obtaining a character texture atlas; and obtaining the texture of the to-be-displayed character from the character texture atlas.

Further, the character display method further includes obtaining a character mapping relationship table. The obtaining the texture of the to-be-displayed character from the character texture atlas includes: looking up the character mapping relationship table for a position of the texture of the to-be-displayed character in the character texture atlas; an obtaining the texture of the to-be-displayed character from the character texture atlas based on the position. The character mapping relationship table includes a mapping relationship between a character and a position of a texture of the character in the character texture atlas.

Further, the character texture atlas is generated by: obtaining a single character; generating, in response to absence of the single character in the character texture atlas, a texture of the single character based on a font attribute of the single character; and drawing the texture of the single character in the character texture atlas.

Further, the character display method further includes: obtaining a texture position of the texture of the single character in the character texture atlas; determining a mapping relationship between the single character and the texture position; and updating the character mapping relationship table based on the mapping relationship between the single character and the texture position.

Further, the displaying the texture of the to-be-displayed character on the screen based on the display parameter and the attribute of the texture of the to-be-displayed character includes: determining, based on the display parameter and the attribute of the texture of the to-be-displayed character, whether the texture of the to-be-displayed character is to be displayed in a wrapping manner; determining a display position of the texture of the to-be-displayed character on the screen, based on the display parameter and the attribute of the texture of the to-be-displayed character that correspond to the determination; and displaying the texture of the to-be-displayed character on the screen based on the display position.

Further, the display parameter includes a line width. The determining, based on the display parameter and the attribute of the texture of the to-be-displayed character, whether the texture of the to-be-displayed character is to be displayed in the wrapping manner includes: calculating a width of a to-be-displayed character line, based on the attribute of the texture of the to-be-displayed character and an attribute of a texture of a character preceding the to-be-displayed character; comparing the width of the to-be-displayed character line with the line width; and determining, based on the comparison, whether the texture of the to-be-displayed character is to be displayed in the wrapping manner.

Further, the determining, based on the comparison, whether the texture of the to-be-displayed character is to be displayed in the wrapping manner includes: determining, when the width of the to-be-displayed character line is smaller than or equal to the line width, that the texture of the to-be-displayed character is to be displayed in the unwrapping manner; and determining, when the width of the to-be-displayed character line is greater than the line width, that the texture of the to-be-displayed character is to be displayed in the wrapping manner.

Further, the display parameter includes a character spacing, an initial origin position, and a line spacing. The determining the display position of the texture of the to-be-displayed character on the screen based on the display parameter and the attribute of the texture of the to-be-displayed character that correspond to the determination includes: determining, in response to determining that the texture of the to-be-displayed character is to be displayed in the unwrapping manner, the display position of the texture of the to-be-displayed character on the screen based on a display position of a previous character to the to-be-displayed character, the character spacing, and the attribute of the texture of the to-be-displayed character; and determining, in response to determining that the texture of the to-be-displayed character is to be displayed in the wrapping manner, the display position of the texture of the to-be-displayed character on the screen based on the display position of the previous character to the to-be-displayed character, the initial origin position, the line spacing, and the attribute of the texture of the to-be-displayed character.

Further, the calculating the width of the to-be-displayed character line based on the attribute of the texture of the to-be-displayed character and the attribute of the texture of the character preceding the to-be-displayed character includes: calculating a first distance from a first border of the texture of the to-be-displayed character to a texture origin of the to-be-displayed character, in which the texture origin is an origin of the texture of the to-be-displayed character in the character texture atlas; calculating an origin of the texture of the to-be-displayed character on the screen based on an origin of the texture of the character preceding the to-be-displayed character on the screen, a size of the character, and a character spacing; and calculating a first position based on the origin of the texture of the to-be-displayed character on the screen and the first distance, in which the first position includes a position of the first border of the texture of the to-be-displayed character on the screen, and the first position represents the width of the to-be-displayed character line.

Further, the comparing the width of the to-be-displayed character line with the line width includes: calculating a position of a first boundary of the to-be-displayed character line based on an origin of a texture of a first character of the to-be-displayed character line on the screen and the line width; determining, when the first position exceeds the position of the first boundary, that the width of the to-be-displayed character line is greater than the line width; and determining, when the first position does not exceed the position of the first boundary, that the width of the to-be-displayed character line is smaller than or equal to the line width.

Further, the display parameter includes an alignment style. The displaying the texture of the to-be-displayed character on the screen includes: determining an offset of a display position based on the alignment style of the display parameter; and displaying the texture of the to-be-displayed character on the screen based on the display position and the offset.

According to one or more embodiments of the present disclosure, a character display apparatus is provided. The character display apparatus includes: a parameter receiving module configured to receive a display parameter; a character obtaining module configured to obtain a to-be-display character; a texture obtaining module configured to obtain a texture of the to-be-displayed character; and a display module configured to display the texture of the to-be-displayed character on a screen based on the display parameter and an attribute of the texture of the to-be-displayed character.

Further, the character obtaining module is further configured to: obtain a to-be-displayed text; and obtain at least one to-be-displayed character by separating characters in the to-be-displayed text.

Further, the texture obtaining module is further configured to: obtain a character texture atlas; and obtain the texture of the to-be-displayed character from the character texture atlas.

Further, the character display apparatus further includes a relationship table obtaining module configured to obtain a character mapping relationship table. The texture obtaining module is further configured to look up the character mapping relationship table for a position of the texture of the to-be-displayed character in the character texture atlas, and obtain the texture of the to-be-displayed character from the character texture atlas based on the position. The character mapping relationship table includes a mapping relationship between a character and a position of a texture of the character in the character texture atlas.

Further, the character texture atlas is generated by: obtaining a single character; generating, in response to absence of the single character in the character texture atlas, a texture of the single character based on a font attribute of the single character; and drawing the texture of the single character in the character texture atlas.

Further, the character texture atlas is generated further by: obtaining a texture position of the texture of the single character in the character texture atlas; determining a mapping relationship between the single character and the texture position; and updating the character mapping relationship table based on the mapping relationship between the single character and the texture position.

Further, the displaying module is further configured to: determining, based on the display parameter and the attribute of the texture of the to-be-displayed character, whether the texture of the to-be-displayed character is to be displayed in a wrapping manner; determine a display position of the texture of the to-be-displayed character on the screen, based on the display parameter and the attribute of the texture of the to-be-displayed character that correspond to the determination; and display the texture of the to-be-displayed character on the screen based on the display position.

Further, the display parameter includes a line width. The displaying module is further configured to: calculate a width of a to-be-displayed character line, based on the attribute of the texture of the to-be-displayed character and an attribute of a texture of a character preceding the to-be-displayed character; compare the width of the to-be-displayed character line with the line width; and determine, based on the comparison, whether the texture of the to-be-displayed character is to be displayed in the wrapping manner.

Further, displaying module is further configured to: determine, when the width of the to-be-displayed character line is smaller than or equal to the line width, that the texture of the to-be-displayed character is to be displayed in the unwrapping manner; and determine, when the width of the to-be-displayed character line is greater than the line width, that the texture of the to-be-displayed character is to be displayed in the wrapping manner.

Further, the display parameter includes a character spacing, an initial origin position, and a line spacing. The displaying module is further configured to: determine, in response to determining that the texture of the to-be-displayed character is to be displayed in the unwrapping manner, the display position of the texture of the to-be-displayed character on the screen based on a display position of a previous character to the to-be-displayed character, the character spacing, and the attribute of the texture of the to-be-displayed character; and determine, in response to determining that the texture of the to-be-displayed character is to be displayed in the wrapping manner, the display position of the texture of the to-be-displayed character on the screen based on the display position of the previous character to the to-be-displayed character, the initial origin position, the line spacing, and the attribute of the texture of the to-be-displayed character.

Further, the displaying module is further configured to: calculate a first distance from a first border of the texture of the to-be-displayed character to a texture origin of the to-be-displayed character, in which the texture origin is an origin of the texture of the to-be-displayed character in the character texture atlas; calculate an origin of the texture of the to-be-displayed character on the screen based on an origin of the texture of the character preceding the to-bedisplayed character on the screen, a size of the character, and a character spacing; and calculate a first position based on the origin of the texture of the to-be-displayed character on the screen and the first distance, in which the first position includes a position of the first border of the texture of the to-be-displayed character on the screen, and the first position represents the width of the to-be-displayed character line.

Further, the displaying module is further configured to: calculate a position of a first boundary of the to-be-displayed character line based on an origin of a texture of a first character of the to-be-displayed character line on the screen and the line width; determine, when the first position exceeds the position of the first boundary, that the width of the to-be-displayed character line is greater than the line width; and determine, when the first position does not exceed the position of the first boundary, that the width of the to-be-displayed character line is smaller than or equal to the line width.

Further, the display parameter includes an alignment style. The displaying module is further configured to: determine an offset of a display position based on the alignment style of the display parameter; and display the texture of the to-be-displayed character on the screen based on the display position and the offset.

According to one or more embodiments of the present disclosure, an electronic device is provided. The electronic device includes at least one processor, and a memory in communication connection with the at least one processor. The memory has instructions stored thereon. The instructions are executable by the at least one processor. The instructions, when executed by the at least one processor, cause the at least one processor to perform any of the character display methods according the above embodiments.

According to one or more embodiments of the present disclosure, a non-transient computer-readable storage medium is provided. The non-transient computer-readable storage medium has computer instructions stored thereon. The computer instructions are configured to cause a computer to perform the character display methods according the above embodiments.

According to one or more embodiments of the present disclosure, a character resource package generating method is provided, which includes any of the character display methods according the above embodiments.

The above description is only intended to explain the preferred embodiments of the present disclosure and the employed principles of technology. It will be appreciated by those skilled in the art that the scope of the present disclosure herein is not limited to the technical solutions formed by the specific combinations of the above technical features, and should also encompass other technical solutions formed by any other combinations of features described above or equivalents thereof without departing from the above concepts of the present disclosure. For example, the above features and the technical features disclosed in the present disclosure having similar functions (but not limited thereto) are replaced with each other to form the technical solution.

What is claimed is:

1. A character display method, comprising:
receiving a display parameter;
obtaining a to-be-displayed character;
obtaining a texture of the to-be-displayed character; and
displaying the texture of the to-be-displayed character on a screen based on the display parameter and an attribute of the texture of the to-be-displayed character,
wherein said displaying the texture of the to-be-displayed character on the screen based on the display parameter and the attribute of the texture of the to-be-displayed character comprises:
determining, based on the display parameter and the attribute of the texture of the to-be-displayed character, whether the texture of the to-be-displayed character is to be displayed in a wrapping manner;
determining a display position of the texture of the to-be-displayed character on the screen, based on the display parameter that corresponds to the determination and the attribute of the texture of the to-be-displayed character; and
displaying the texture of the to-be-displayed character on the screen based on the display position.

2. The character display method according to claim 1, wherein said obtaining the to-be-displayed character comprises:
obtaining a to-be-displayed text; and
obtaining at least one to-be-displayed character by separating characters in the to-be-displayed text.

3. The character display method according to claim 1, wherein said obtaining the texture of the to-be-displayed character comprises:
obtaining a character texture atlas; and
obtaining the texture of the to-be-displayed character from the character texture atlas.

4. The character display method according to claim 3, further comprising obtaining a character mapping relationship table,
wherein said obtaining the texture of the to-be-displayed character from the character texture atlas comprises:
looking up the character mapping relationship table for a position of the texture of the to-be-displayed character in the character texture atlas; and
obtaining the texture of the to-be-displayed character from the character texture atlas based on the position,
wherein the character mapping relationship table comprises a mapping relationship between a character and a position of a texture of the character in the character texture atlas.

5. The character display method according to claim 4, wherein the character texture atlas is generated by:
obtaining a single character;
generating, in response to absence of the single character in the character texture atlas, a texture of the single character based on a font attribute of the single character; and
drawing the texture of the single character in the character texture atlas.

6. The character display method according to claim 5, further comprising:
obtaining a texture position of the texture of the single character in the character texture atlas;
determining a mapping relationship between the single character and the texture position; and
updating the character mapping relationship table based on the mapping relationship between the single character and the texture position.

7. The character display method according to claim 1, wherein:
the display parameter comprises a line width; and
said determining, based on the display parameter and the attribute of the texture of the to-be-displayed character, whether the texture of the to-be-displayed character is to be displayed in the wrapping manner comprises:

calculating a width of a to-be-displayed character line, based on the attribute of the texture of the to-be-displayed character and an attribute of a texture of a character preceding the to-be-displayed character;

comparing the width of the to-be-displayed character line with the line width; and determining, based on the comparing the width of the to-be-displayed character line with the line width, whether the texture of the to-be-displayed character is to be displayed in the wrapping manner.

8. The character display method according to claim 7, wherein said determining, based on the comparing with the width of the to-be-displayed character line with the line width, whether the texture of the to-be-displayed character is to be displayed in the wrapping manner comprises:

determining, when the width of the to-be-displayed character line is smaller than or equal to the line width, that the texture of the to-be-displayed character is to be displayed in an unwrapping manner; and determining, when the width of the to-be-displayed character line is greater than the line width, that the texture of the to-be-displayed character is to be displayed in the wrapping manner.

9. The character display method according to claim 7, wherein said calculating the width of the to-be-displayed character line based on the attribute of the texture of the to-be-displayed character and the attribute of the texture of the character preceding the to-be-displayed character comprises:

calculating a first distance from a first border of the texture of the to-be-displayed character to a texture origin of the to-be-displayed character, wherein the texture origin is an origin of the texture of the to-be-displayed character in a character texture atlas;

calculating an origin of the texture of the to-be-displayed character on the screen based on an origin of the texture of the character preceding the to-be-displayed character on the screen, a size of the character, and a character spacing; and calculating a first position based on the origin of the texture of the to-be-displayed character on the screen and the first distance, wherein the first position comprises a position of the first border of the texture of the to-be-displayed character on the screen, and the first position represents the width of the to-be-displayed character line.

10. The character display method according to claim 9, wherein said comparing the width of the to-be-displayed character line with the line width comprises:

calculating a position of a first boundary of the to-be-displayed character line based on an origin of a texture of a first character of the to-be-displayed character line on the screen and the line width;

determining, when the first position exceeds the position of the first boundary, that the width of the to-be-displayed character line is greater than the line width; and determining, when the first position does not exceed the position of the first boundary, that the width of the to-be-displayed character line is smaller than or equal to the line width.

11. The character display method according to claim 1, wherein:

the display parameter comprises a character spacing, an initial origin position, and a line spacing; and said determining the display position of the texture of the to-be-displayed character on the screen based on the display parameter that corresponds to the determination and the attribute of the texture of the to-be-displayed character comprises:

determining, in response to determining that the texture of the to-be-displayed character is to be displayed in an unwrapping manner, the display position of the texture of the to-be-displayed character on the screen based on a display position of a previous character to the to-be-displayed character, the character spacing, and the attribute of the texture of the to-be-displayed character; and determining, in response to determining that the texture of the to-be-displayed character is to be displayed in the wrapping manner, the display position of the texture of the to-be-displayed character on the screen based on the display position of the previous character to the to-be-displayed character, the initial origin position, the line spacing, and the attribute of the texture of the to-be-displayed character.

12. The character display method according to claim 1, wherein:

the display parameter comprises an alignment style; and said displaying the texture of the to-be-displayed character on the screen comprises:

determining an offset of a display position based on the alignment style of the display parameter; and displaying the texture of the to-be-displayed character on the screen based on the display position and the offset.

13. An electronic device, comprising:

a memory having computer-readable instructions stored thereon; and a processor configured to execute the computer-readable instructions, wherein the computer-readable instructions, when executed, cause the electronic device to implement operations of:

receiving a display parameter;

obtaining a to-be-displayed character;

obtaining a texture of the to-be-displayed character; and displaying the texture of the to-be-displayed character on a screen based on the display parameter and an attribute of the texture of the to-be-displayed character, wherein said displaying the texture of the to-be-displayed character on the screen based on the display parameter and the attribute of the texture of the to-be-displayed character comprises:

determining, based on the display parameter and the attribute of the texture of the to-be-displayed character, whether the texture of the to-be-displayed character is to be displayed in a wrapping manner;

determining a display position of the texture of the to-be-displayed character on the screen, based on the display parameter that corresponds to the determination and the attribute of the texture of the to-be-displayed character; and displaying the texture of the to-be-displayed character on the screen based on the display position.

14. The electronic device according to claim 13, wherein said obtaining the to-be-displayed character comprises:

obtaining a to-be-displayed text; and obtaining at least one to-be-displayed character by separating characters in the to-be-displayed text.

15. The electronic device according to claim 13, wherein said obtaining the texture of the to-be-displayed character comprises:

obtaining a character texture atlas; and obtaining the texture of the to-be-displayed character from the character texture atlas.

16. The electronic device according to claim 15, wherein:
the computer-readable instructions, when executed, cause the electronic device to obtain a character mapping relationship table;
said obtaining the texture of the to-be-displayed character from the character texture atlas comprises:
looking up the character mapping relationship table for a position of the texture of the to-be-displayed character in the character texture atlas; and
obtaining the texture of the to-be-displayed character from the character texture atlas based on the position; and
the character mapping relationship table comprises a mapping relationship between a character and a position of a texture of the character in the character texture atlas.

17. The electronic device according to claim 16, wherein the character texture atlas is generated by:
obtaining a single character;
generating, in response to absence of the single character in the character texture atlas, a texture of the single character based on a font attribute of the single character; and
drawing the texture of the single character in the character texture atlas.

18. A non-transient computer-readable storage medium, having computer-readable instructions stored thereon, wherein the computer-readable instructions, when executed by a computer, cause the computer to implement operations of:
receiving a display parameter;
obtaining a to-be-displayed character;
obtaining a texture of the to-be-displayed character; and
displaying the texture of the to-be-displayed character on a screen based on the display parameter and an attribute of the texture of the to-be-displayed character,
wherein said displaying the texture of the to-be-displayed character on the screen based on the display parameter and the attribute of the texture of the to-be-displayed character comprises:
determining, based on the display parameter and the attribute of the texture of the to-be-displayed character, whether the texture of the to-be-displayed character is to be displayed in a wrapping manner;
determining a display position of the texture of the to-be-displayed character on the screen, based on the display parameter that corresponds to the determination and the attribute of the texture of the to-be-displayed character; and
displaying the texture of the to-be-displayed character on the screen based on the display position.

19. A character resource package generating method, comprising the character display method according to claim 1.

* * * * *